(12) United States Patent
Petrenko

(10) Patent No.: US 7,638,735 B2
(45) Date of Patent: Dec. 29, 2009

(54) PULSE ELECTROTHERMAL AND HEAT-STORAGE ICE DETACHMENT APPARATUS AND METHODS

(75) Inventor: Victor Petrenko, Lebanon, NH (US)

(73) Assignee: The Trustees of Dartmouth College, Hanover, NH (US)

( * ) Notice: Subject to any disclaimer, the term of this patent is extended or adjusted under 35 U.S.C. 154(b) by 0 days.

(21) Appl. No.: 11/338,239

(22) Filed: Jan. 24, 2006

(65) Prior Publication Data
US 2006/0272340 A1 Dec. 7, 2006

Related U.S. Application Data

(60) Continuation-in-part of application No. 10/939,289, filed on Sep. 13, 2004, and a continuation-in-part of application No. PCT/US2005/022035, filed on Jun. 22, 2005, and a continuation-in-part of application No. 10/939,289, filed on Sep. 9, 2004, now Pat. No. 7,034,257, which is a division of application No. 10/364,438, filed on Feb. 11, 2003, now Pat. No. 6,870,139.

(60) Provisional application No. 60/646,394, filed on Jan. 24, 2005, provisional application No. 60/646,932, filed on Jan. 25, 2005, provisional application No. 60/739,506, filed on Nov. 23, 2005, provisional application No. 60/581,912, filed on Jun. 22, 2004, provisional application No. 60/646,932, filed on Jan. 25, 2005, provisional application No. 60/404,872, filed on Aug. 21, 2002, provisional application No. 60/398,004, filed on Jul. 23, 2002, provisional application No. 60/356,476, filed on Feb. 11, 2002.

(51) Int. Cl.
*H05B 1/00* (2006.01)
*F25C 1/12* (2006.01)

(52) U.S. Cl. .......................... 219/200; 62/73

(58) Field of Classification Search ................. 219/200, 219/201, 209, 494, 483, 485; 62/138, 276, 62/301
See application file for complete search history.

(56) References Cited

U.S. PATENT DOCUMENTS 1,157,344 A 10/1915 Thomson
(Continued)

FOREIGN PATENT DOCUMENTS

BE 410 547 A 7/1935
(Continued)

OTHER PUBLICATIONS

Petrenko, Victor, et al, "Pulse Electrothermal De-Icing," Proceedings of the International Offshore and Polar Engineering Conference, p. 435-438, May 25, 2003.
(Continued)

*Primary Examiner*—Tu B Hoang
*Assistant Examiner*—Vinod D Patel
(74) *Attorney, Agent, or Firm*—Lathrop & Gage LLP

(57) ABSTRACT

Systems and methods for pulse electrothermal and heat-storage ice detachment. A pulse electrothermal ice detachment apparatus includes one or more coolant tubes, and optionally, fins in thermal contact with the coolant tubes. The tubes and/or fins form a resistive heater. One or more switches may apply electrical power to the resistive heater, generating heat to detach ice from the tubes and/or the fins. A freezer unit forms a heat-storage icemaking system having a compressor and a condenser for dissipating waste heat, and coolant that circulates through the compressor, the condenser and a coolant tube. The coolant tube is in thermal contact with an evaporator plate. A tank, after the compressor and before the condenser, transfers heat from the coolant to a heating liquid. The heating liquid periodically flows through a heating tube in thermal contact with the evaporator plate, detaching ice from the evaporator plate.

21 Claims, 20 Drawing Sheets

U.S. PATENT DOCUMENTS

| | | | |
|---|---|---|---|
| 1,656,329 A | | 1/1928 | Sievert et al. |
| 2,024,612 A | * | 12/1935 | Sulzberger .................. 62/301 |
| 2,205,543 A | | 6/1940 | Rideau et al. |
| 2,496,279 A | | 2/1950 | Ely et al. |
| 2,522,199 A | | 9/1950 | Shreve |
| 2,870,311 A | | 1/1959 | Greenfield et al. |
| 2,988,899 A | * | 6/1961 | Heron ..................... 62/276 |
| 3,204,084 A | | 8/1965 | Spencer, Jr. et al. |
| 3,256,920 A | | 6/1966 | Byers |
| 3,316,344 A | | 4/1967 | Kidd et al. |
| 3,316,345 A | | 4/1967 | Toms et al. |
| 3,380,261 A | * | 4/1968 | Hendrix et al. ............. 62/138 |
| 3,790,752 A | | 2/1974 | Boaz et al. |
| 3,809,341 A | | 5/1974 | Levin et al. |
| 3,825,371 A | | 7/1974 | Roder et al. |
| 3,835,269 A | | 9/1974 | Levin et al. |
| 3,915,883 A | | 10/1975 | VanMater et al. |
| 3,964,183 A | | 6/1976 | Muoat |
| 3,971,056 A | | 7/1976 | Jaskolski et al. |
| 4,081,914 A | | 4/1978 | Rautenbach et al. |
| 4,082,962 A | | 4/1978 | Burgsdorf |
| 4,085,338 A | | 4/1978 | Genrikh et al. |
| 4,119,866 A | | 10/1978 | Genrikh et al. |
| 4,135,221 A | | 1/1979 | Genrikh et al. |
| 4,137,447 A | | 1/1979 | Boaz |
| 4,190,137 A | | 2/1980 | Shimada et al. |
| 4,278,875 A | | 7/1981 | Bain |
| 4,321,296 A | | 3/1982 | Rougier |
| 4,330,703 A | | 5/1982 | Horsma et al. |
| 4,442,681 A | | 4/1984 | Fischer et al. |
| 4,531,380 A | * | 7/1985 | Hagen .................. 62/320 |
| 4,571,860 A | | 2/1986 | Long |
| 4,638,960 A | | 1/1987 | Straube et al. |
| 4,690,353 A | | 9/1987 | Haslim et al. |
| 4,732,351 A | | 3/1988 | Bird |
| 4,737,618 A | | 4/1988 | Barbier et al. |
| 4,760,978 A | | 8/1988 | Schuyler et al. |
| 4,773,976 A | | 9/1988 | Vexler |
| 4,798,058 A | * | 1/1989 | Gregory ................. 62/278 |
| 4,814,546 A | | 3/1989 | Whitney et al. |
| 4,820,902 A | | 4/1989 | Howard |
| 4,862,055 A | | 8/1989 | Maruyama et al. |
| 4,875,644 A | | 10/1989 | Adams et al. |
| 4,887,041 A | | 12/1989 | Mashikian |
| 4,897,597 A | | 1/1990 | Whitener |
| 4,950,950 A | | 8/1990 | Perry et al. |
| 4,985,313 A | | 1/1991 | Penneck et al. |
| 5,057,763 A | | 10/1991 | Torii et al. |
| 5,109,140 A | | 4/1992 | Nguyen |
| 5,112,449 A | | 5/1992 | Jozefowicz et al. |
| 5,143,325 A | | 9/1992 | Zieve et al. |
| 5,144,962 A | | 9/1992 | Counts et al. |
| 5,218,472 A | | 6/1993 | Jozefowicz et al. |
| 5,344,696 A | | 9/1994 | Hastings et al. |
| 5,398,547 A | | 3/1995 | Gerardi et al. |
| 5,408,844 A | | 4/1995 | Stokes et al. |
| 5,411,121 A | | 5/1995 | LaForte et al. |
| 5,441,305 A | | 8/1995 | Tabar |
| 5,496,989 A | | 3/1996 | Bradford et al. |
| 5,523,959 A | | 6/1996 | Seegmiller |
| 5,551,288 A | | 9/1996 | Geraldi et al. |
| 5,582,754 A | | 12/1996 | Smith |
| 5,605,418 A | | 2/1997 | Watanabe et al. |
| 5,744,704 A | | 4/1998 | Hu et al. |
| 5,861,855 A | | 1/1999 | Arsenault et al. |
| 5,873,254 A | | 2/1999 | Arav |
| 5,886,321 A | | 3/1999 | Pinchok et al. |
| 5,902,962 A | | 5/1999 | Gazdzinski |
| 5,934,617 A | | 8/1999 | Rutherford et al. |
| 5,947,418 A | | 9/1999 | Bessiere et al. |
| 6,018,152 A | | 1/2000 | Allaire et al. |
| 6,027,075 A | | 2/2000 | Petrenko |
| 6,031,214 A | | 2/2000 | Bost et al. |
| 6,129,314 A | | 10/2000 | Giamati et al. |
| 6,133,555 A | * | 10/2000 | Brenn .................. 219/497 |
| 6,145,787 A | | 11/2000 | Rolls |
| 6,193,793 B1 | | 2/2001 | Long et al. |
| 6,194,685 B1 | | 2/2001 | Rutherford |
| 6,227,492 B1 | | 5/2001 | Schellhase et al. |
| 6,237,874 B1 | | 5/2001 | Rutherford et al. |
| 6,239,601 B1 | | 5/2001 | Weinstein |
| 6,246,831 B1 | * | 6/2001 | Seitz et al. ................. 392/486 |
| 6,270,118 B1 | | 8/2001 | Ichikawa |
| 6,279,856 B1 | | 8/2001 | Rutherford et al. |
| 6,294,765 B1 | * | 9/2001 | Brenn .................. 219/494 |
| 6,297,165 B1 | | 10/2001 | Okumura et al. |
| 6,297,474 B1 | | 10/2001 | Kelly et al. |
| 6,330,986 B1 | | 12/2001 | Rutherford et al. |
| 6,396,172 B1 | | 5/2002 | Couture |
| 6,427,946 B1 | | 8/2002 | Petrenko |
| 6,492,629 B1 | | 12/2002 | Sopory |
| 6,558,947 B1 | | 5/2003 | Lund et al. |
| 6,653,598 B2 | | 11/2003 | Petrenko et al. |
| 6,693,786 B2 | | 2/2004 | Petrenko |
| 6,723,971 B1 | | 4/2004 | Petrenko et al. |
| 6,825,444 B1 | | 11/2004 | Tuan et al. |
| 6,870,139 B2 | | 3/2005 | Petrenko |
| 7,034,257 B2 | | 4/2006 | Petrenko |
| 2001/0052731 A1 | | 12/2001 | Petrenko |
| 2002/0017466 A1 | | 2/2002 | Petrenko |
| 2002/0092849 A1 | | 7/2002 | Petrenko |
| 2002/0096515 A1 | | 7/2002 | Petrenko |
| 2002/0118550 A1 | | 8/2002 | Petrenko et al. |
| 2002/0170909 A1 | | 11/2002 | Petrenko |
| 2002/0175152 A1 | | 11/2002 | Petrenko |
| 2003/0024726 A1 | | 2/2003 | Petrenko |
| 2003/0046942 A1 | | 3/2003 | Shedivy et al. |
| 2003/0155467 A1 | | 8/2003 | Petrenko |
| 2003/0155740 A1 | | 8/2003 | Lammer |
| 2006/0086715 A1 | | 4/2006 | Briggs |
| 2007/0045282 A1 | | 3/2007 | Petrenko |

FOREIGN PATENT DOCUMENTS

| | | |
|---|---|---|
| BE | 528 926 A | 6/1954 |
| DE | 14 76 989 A1 | 10/1969 |
| DE | 25 10 755 A1 | 9/1976 |
| DE | 2510660 A1 | 9/1976 |
| DE | 2510755 A1 | 9/1976 |
| DE | 36 26 613 A1 | 2/1988 |
| DE | 3921900 C1 | 7/1990 |
| DE | 4440634 | 7/1996 |
| EP | 1168888 | 1/2002 |
| FR | 2570333 | 3/1986 |
| GB | 820 908 A | 9/1959 |
| GB | 917 055 A | 1/1963 |
| GB | 2 106 966 A | 4/1981 |
| GB | 2 252 285 A | 5/1992 |
| GB | 2 259 287 A | 3/1993 |
| GB | 2261333 | 5/1993 |
| GB | 2319943 A | 6/1998 |
| JP | 405292638 A | 11/1993 |
| JP | 407023520 A | 1/1995 |
| JP | 2005180823 | 7/2005 |
| JP | 2005180824 | 7/2005 |
| RU | 2289892 | 1/2006 |
| SU | 983433 | 12/1982 |
| WO | WO 00/24634 | 5/2000 |
| WO | WO 00/24634 A | 5/2000 |
| WO | WO 00/33614 | 6/2000 |
| WO | WO 00/33614 A | 6/2000 |
| WO | WO 00/52966 | 9/2000 |
| WO | WO 01/08973 | 2/2001 |
| WO | WO 01/49564 | 7/2001 |

| WO | WO 03/062056 A | 7/2003 |
| WO | WO 03/069955 | 8/2003 |
| WO | WO 2005/061974 A | 7/2005 |
| WO | WO 2006/002224 A | 1/2006 |
| WO | WO 2006/081180 | 3/2006 |

OTHER PUBLICATIONS

International Search Report and Written Opinion from PCT/US2006/002283, Sep. 14, 2006.
Database WPI, Section PQ, Week 198343, Derwent Publications Ltd., London, GB, An 1983-799800 XP002350584 & SU 983 433 A (Lengd Refrig Ind) Abstract, Dec. 23, 1982.
"The Evolution of Ice Protection Creates a Revolution in Ice Detection," BF Goodrich AErospace Ice Protection Systems, 2 pages.
Petrenko, V.F. & Peng, S., "Reduction of Ice Adhesion to Metal by Using Self-Assembling Monolayers (SAMs)", Canadian Journal of Physics, Jan./Feb. 2003, pp. 387-393, vol. 81, No. ½.
Petrenko, Victor F., "Electromechanical Phenomena in Ice," Thayer School of Engineering Special Report 96-2; Feb. 1996.
Petrenko, Victor F., and Whitworth, Robert W., "Physics of Ice," copyright 1999, pp. 1-373, Oxford University Press, Oxford, New York.
Petrenko, Victor F.; "Study of the Surface of Ice, Ice/Solid and Ice/Liquid Interfaces with Scanning Force Microscopy;" American Chemical Society Jun. 2, 1997.
Petrenko, Victor F., "The effect of static electric fields on ice friction", Journal of Applied Physics, Jul. 15, 1994, pp. 1216-1219, vol. 76, No. 2.
Petrenko, Victor F. and Colebeck, Samuel C., "Generation of electric fields by ice and snow friction", Journal of Applied Physics, May 1, 1995, pp. 4518-4521, vol. 77, No. 9.
Petrenko, V.F. and Schulson, E.M., "Action of Electric Fields on the Plastic Deformation of Pure and Doped Ice Single Crystals", Philosophical Magazine A, 1993, pp. 173-185, vol. 67, No. 1.
Reich, A., AIA 94-0714, "Interface Influences Upon Ice Adhesion to Airfoil Materials", BFGoodrich Aerospace/De-icing Systems, Brecksville/Uniontown, OH (32nd Aerospace Sciences Meeting and Exhibit, Jan. 10-13, 1994), pp. 1-8.
"Icing Wind Tunnel", Meeting the Challenges of Ice Testing in a World-Class Facility—BFGoodrich Aerospace Ice Protection Systems, 4 pages.
"Everstart Automotive", http://www.everstart-batteries.com/products/use/automotive.asp, May 5, 2003, 1 page.
"Maxwell Technologies: Ultracapacitors-Boostcap PC2500", http://www.maxwell.com/ultracapacitors/products/PC2500.html, May 5, 2003, 2 pages.
Phillips, Edward H., "New Goodrich Wind Tunnel Tests Advanced Aircraft De-Icing Systems", Uniontown, Ohio, Aviation Week Magazine, Oct. 3, 1988, 3 pages.
Courville, Z. & Petrenko, V.F., "De-icing Layers of Interdigitated Microelectrodes", Mat. Res. Soc. Symp. Proc. 2000, pp. 329-334, vol. 604.
Petrenko, V.F & Qi, Suogen, "Reduction of Ice Adhesion to Stainless Steel by Ice Electrolysis", Journal of Applied Phy7sics, pp. 5450-5454, Nov. 1999, vol. 86, No. 10.
International Search Report, Related Application, PCT/US98/12421, Feb. 16, 1999.
International Search Report, PCT/US99/28330, Jul. 19, 2000.
International Search Report, PCT/US99/25124, mailed Feb. 29, 2000.
International Search Report, PCT/US00/05665, mailed Aug. 4, 2000.
International Search Report, PCT/US00/35529, mailed Jun. 14, 2001.
International Search Report, PCT/US03/04170, mailed Jul. 1, 2003.
U.S. Appl. No. 10/364,438, selected pages of Image File Wrapper, Apr. 5, 2004 through Nov. 2, 2004; 44 pages.
U.S. Appl. No. 10/939,289, selected pages of Image File Wrapper, Mar. 28, 2005 through Feb. 21, 2006; 45 pages.
U.S. Appl. No. 11/409,914, selected pages of Image File Wrapper, Feb. 12, 2007 through Mar. 31, 2008; 55 pages.
Incropera, F.P. & DeWitt, D.P.; Fundamentals of Heat and Mass Transfer; 5th Ed.; John Wiley & Sons; 2002; pp. 596-601.
PCT/US00/35529, International Preliminary Examination Report, Jul.19, 2004; 3 pages.
PCT/US00/05665 International Search Report dated Jun. 26, 2000; 2 pages.
PCT/US03/04170, Written Opinion mailed Sep. 30, 2003; 2 pages.
PCT/US03/04170, International Preliminary Examination Report dated Dec. 17, 2003; 2 pages.
PCT/US05/022035 Response to Written Opinion, May 15, 2006; 38 pages.
PCT/US05/022035 International Preliminary Report On Patentability & Written Opinion, Feb. 15, 2006; 39 pages.
PCT/US06/002283, International Preliminary Report On Patentability & Written Opinion dated Jul. 24, 2007; 12 pages.
PCT/US06/002283, Invitation to Pay Additional Fees, Jul. 28, 2006; 6 pages.
PCT/US07/69478, International Search Report and Written Opinion, Jul. 21, 2008; 13 pages.
European Application 03709059 Communication Pursuant to Article 96(2) EPC; Aug 14, 2007; 4 pages.
European Application 03709059; Communication Pursuant to Article 96(2) EPC; Jun. 9, 2006; 6 pages.
European Application 03709059; Communication Pursuant to Article 96(2) EPC; Jan. 8, 2007; 5 pages.
European Application 03709059; Decision to Grant a European Patent; Jul. 18, 2008;2 pages.
Canadian Application 2,476,202; Restriction dated Feb. 22, 2008; 2 pages.
Canadian Application 2,476,202; Response to Restriction filed Aug. 22, 2008; 17 pages.
Japanese Application 2003-568934; Response filed Jul. 18, 2008; 22 pages.
Japanese Application 2003-568934; Rejection dated Jan. 11, 2008; 7 pages.
Russian Application 2004127250; Decision on Grant; Jun. 5, 2006.
Russian Application 2004127250; English Translation of Office Action; Aug. 2005; 4 pages.
Korean Application No. 10-2004-7012335 Certificate of Patent; Patent No. 10-0799779 with English Abstract; Jan. 24, 2008; 3 pages.
Korean Application No. 10-2004-7012335; Office Action; Apr. 27, 2007 with English language Summary of the Office Action; 5 pages.
Korean Application No. 10-2004-7012335 Office Action; Oct. 24, 2006 with English language Summary of the Office Action; 5 pages.
Korean Application No. 10-2007-7001352 Office Action; Mar. 31, 2008 with English language Summary of the Office Action; 7 pages.
European Application 06719229.4; Communication Pursuant to Rules 109 and 1110 EPC; Sep. 4. 2007; 2 pages.
European Application 05761644.3; Communication Pursuant to Rules 109 and 1110 EPC; Feb. 13, 2007; 2 pages.
European Application 05761644.3; Communication Pursuant to Article 94(3) EPC; Sep. 18, 2008; 3 pages.
European Application 05761644.3; Reply to Communication Pursuant to Article 94(3) EPC; Filed Jan. 28, 2009, 72 pages.
U.S. Appl. No. 11/409,914, Office Action mailed Jan. 26, 2009, 6 pages.
U.S. Appl. No. 11/409,914, Response to Office Action filed Sep. 23, 2008, 9 pages.
U.S. Appl. No. 11/409,914, Advisory Action mailed Oct. 20, 2008, 3 pages.
U.S. Appl. No. 11/409,914, Response and Request for Continued Examination filed Oct. 23, 2008; 12, pages.
Chinese Application No. 200680003031.6 Office Action with English Translation, Oct. 17, 2008; 23 pages.
Ukrainian Application 20040907418; Decision on Grant dated Jan. 17, 2007; pp. 1-12.
Chinese Application No. 03808185.7 English Translation of Office Action dated May 9, 2008, 10 pages.
PCT/US08/55928; Invitation to Pay Additional Fees & Partial Search Report, Oct. 31, 2008,4 pages.
PCT/US08/55928, International Search Report & Written Opinion mailed Jan. 13, 2009, 16 pages.
PCT/US08/55928, Response to Written Opinion filed Apr. 13, 2009, 10 pages.

PCT/US08/55928, International Preliminary Report on Patentability mailed Jun. 5, 2009; 11 pages.

PCT/US2008/081902, Invitation to Pay Additional Fees, mailed Apr. 3, 2009, 10 pages.

U.S. Appl. No. 11/409,914, Response to Office Action filed Apr. 14, 2009, 5 pages.

U.S. Appl. No. 11/409,914, Notice of Allowance mailed Jul. 24, 2009, 5 pages.

Canadian Application No. 2,570,986, Office Action dated Dec. 29, 2008, 3 pages.

Canadian Application No. 2,570,986 Response to Office Action dated Jun. 23, 2009, 13 pages.

Korean Application No. 10-2007-7001352 Notice of Final Decision for Patent Registration, Apr. 22, 2009, 3 pages.

Canadian Application 2,476,202 Notice of Allowance dated Dec. 5, 2008, 1 page.

\* cited by examiner

PULSE ELECTROTHERMAL AND HEAT-STORAGE ICE DETACHMENT APPARATUS AND METHODS

CROSS-REFERENCE TO RELATED APPLICATIONS

This application claims the benefit of priority to commonly-owned and U.S. Provisional Patent Applications Nos. 60/646,394, filed 24 Jan. 2005, 60/646,932, filed 25 Jan. 2005, and 60/739,506, filed 23 Nov. 2005. This application is also a continuation-in-part of commonly-owned and copending U.S. Patent Application No. PCT/US2005/22035 filed 22 Jun. 2005, which claims the benefit of priority to U.S. Provisional Patent Applications Nos. 60/581,912, filed 22 Jun. 2004, 60/646,394, filed 24 Jan. 2005, and 60/646,932, filed 25 Jan. 2005. This application is also a continuation-in-part of commonly-owned and copending U.S. patent application Ser. No. 10/939,289 filed 10 Sep. 2004, which is a divisional application that claims the benefit of priority to U.S. patent application Ser. No. 10/364,438, now U.S. Pat. No. 6,870,139, filed 11 Feb. 2003, which claims the benefit of priority to U.S. Provisional Patent Applications Nos. 60/356,476, filed 11 Feb. 2002, 60/398,004, filed 23 Jul. 2002, and 60/404,872, filed 21 Aug. 2002. All of the above-identified patent applications are incorporated herein by reference.

BACKGROUND

Ice or frost may accumulate on cold surfaces in the presence of water vapor or liquid. Detachment of such ice or frost may be desirable for purposes of keeping the surfaces clear (e.g., for purposes of improving thermal transfer, traction or aerodynamic properties) or so that the ice may be harvested for use. It is advantageous in most refrigeration applications to expend a minimum of energy to clear certain surfaces of ice.

SUMMARY

In one embodiment, pulse electrothermal ice detachment apparatus includes one or more coolant tubes, and fins, of a refrigeration unit. The fins are in thermal contact with the coolant tubes, and one or both of the tubes or fins forms a resistive heater. One or more switches may apply electrical power to the resistive heater, generating heat to detach ice from the tubes and/or the fins. The resistive heater may form more than one heater section, and switches may be configured to apply the electrical power to the heater sections individually.

In another embodiment, pulse electrothermal ice detachment apparatus includes one or more coolant tubes of a refrigeration unit. The one or more tubes form a resistive heater. One or more switches may apply electrical power to the heater, generating heat to detach ice from the tubes.

In another embodiment, a method detaches ice from coolant tubes and/or cooling fins of a refrigeration unit. Steps of the method include accumulating ice on the coolant tubes and/or the cooling fins during a normal refrigeration mode, and applying a pulse of electrical power to one or both of the tubes and the fins to detach the ice.

In another embodiment, a pulse electrothermal ice detachment apparatus includes an icemaking tube with one or more ice growth regions. One or more cold fingers and/or coolant tubes transfer heat away from each ice growth region. Water is introduced into the icemaking tube so that at least a portion of the water freezes into ice at the ice growth regions. A power supply periodically supplies a pulse of electrical power to the tube or to a heater in thermal contact with the tube, melting at least an interfacial layer of the ice to detach the ice from the tube.

In another embodiment, pulse electrothermal ice detachment apparatus includes more than one icemaking tube. Cold fingers and/or coolant tubes transfer heat away from ice growth regions of each icemaking tube. Water is introduced into each icemaking tube so that at least a portion of the water freezes into ice at the ice growth regions. A power supply periodically supplies a pulse of electrical power to each tube, melting at least an interfacial layer of the ice to detach the ice from the tubes.

In another embodiment, pulse electrothermal ice detachment apparatus includes one or more coolant tubes in thermal contact with an evaporator plate. One or more heaters are located adjacent to the evaporator plate and between the coolant tubes. The heaters are configured for converting electrical power to heat, so that ice detaches from the evaporator plate.

In another embodiment, pulse electrothermal ice detachment apparatus includes one or more coolant tubes in thermal contact with an evaporator plate. A heater is located between the coolant tubes and the evaporator plate. The heater is configured for converting electrical power to heat, so that ice detaches from the evaporator plate.

In another embodiment, a freezer unit is configured as a heat-storage icemaking system. The freezer unit has a compressor and a condenser for dissipating waste heat, and coolant that circulates through the compressor, the condenser and a coolant tube. The coolant tube is in thermal contact with an evaporator plate. A tank, after the compressor and before the condenser, transfers heat from the coolant to a heating liquid. The heating liquid periodically flows through a heating tube in thermal contact with the evaporator plate, detaching ice from the evaporator plate.

In another embodiment, a method detaches ice from a coolant tube, cooling fins and/or an evaporator plate of a refrigeration unit. Heat transfers from a coolant to a heating liquid during an icemaking or refrigeration mode. Ice accumulates on the coolant tube, cooling fins and/or evaporator plate during the icemaking or refrigeration mode. The heating liquid flows through heating tubes in thermal contact with at least one of the coolant tube, cooling fins and evaporator plate to detach the ice.

In another embodiment, a pulse electrothermal ice detachment apparatus includes a heat exchanger having a coolant tube that is in thermal contact with heat exchanging surfaces. A power supply is electrically switched to the heat exchanger for pulse heating.

DETAILED DESCRIPTION OF DRAWINGS

Heat exchangers serve to transfer heat between thermal masses. In one heat exchanger configuration, air circulates adjacent to heat exchanger surfaces that are cooled by a circulating coolant; the air gives up heat to the coolant. When temperature of the coolant is low enough, ice may form on the surfaces, impeding heat exchange between the surfaces and the air. It is desirable to remove such ice with a minimum of added heat, since a surface that is heated must be re-cooled in order to resume heat exchange with the air.

Figure 1:
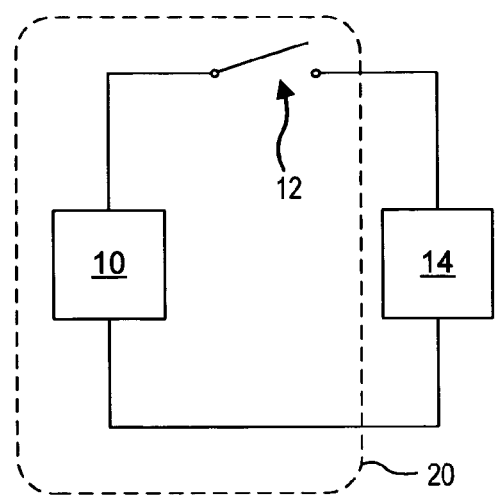
FIG. 1 schematically shows one pulse electrothermal ice detachment apparatus, in accord with an embodiment.

FIG. 1 schematically shows a pulse electrothermal ice detachment apparatus 20. Apparatus 20 includes a heater 10, and a switch 12 that controls application of electric power from a power supply 14 to heater 10. In other embodiments, a power supply 14 may form part of an apparatus 20. Apparatus 20 operates to detach ice from one or more surfaces, as described in more detail below. As used herein, "detach" may mean loosening ice from one or more surfaces by melting at least an interfacial layer of the ice, or it may mean complete melting and/or vaporization of the ice.

Figure 2A:
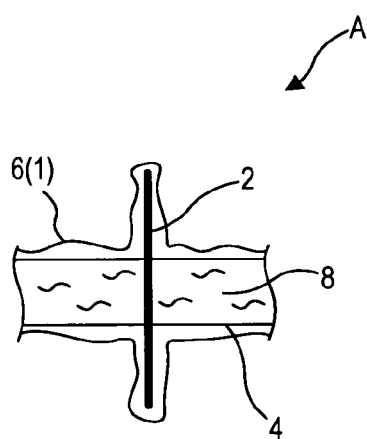
FIG. 2A and FIG. 2B show a portion A of the pulse electrothermal ice detachment apparatus of FIG. 1.
Figure 2B:
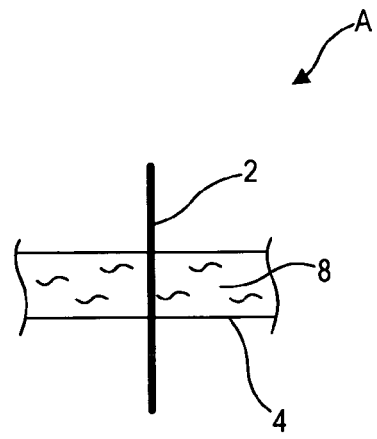
Figure 3:
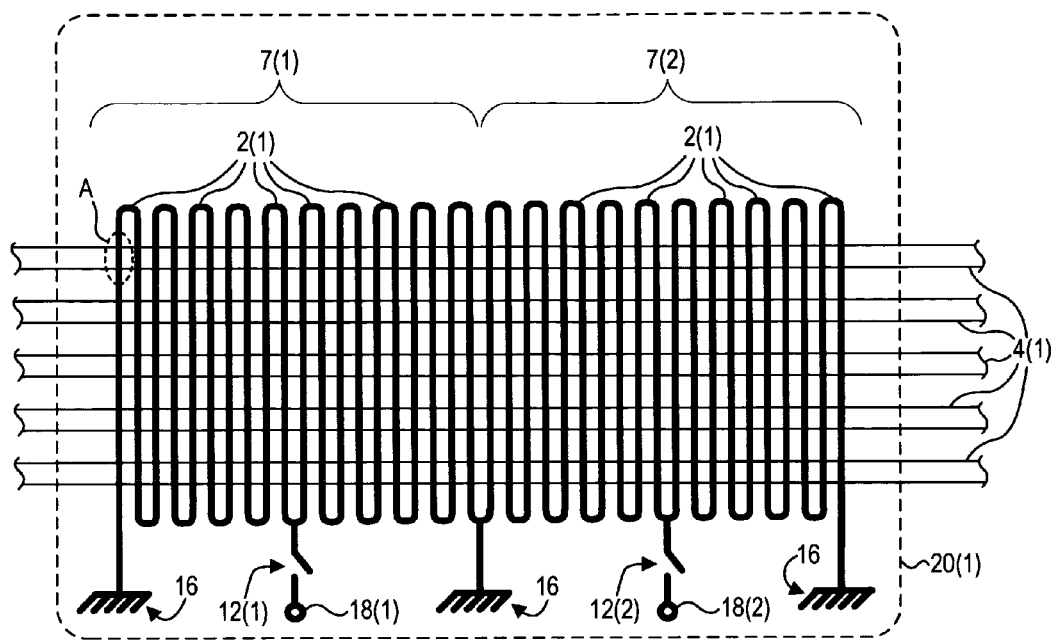
FIG. 3 shows one pulse electrothermal ice detachment apparatus, in accord with an embodiment.
Figure 4:
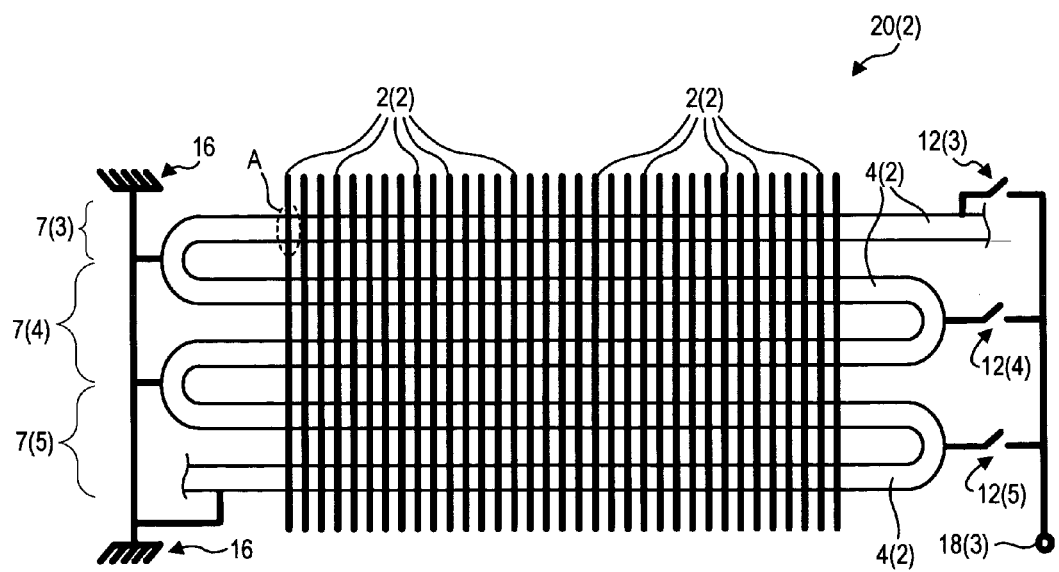
FIG. 4 shows one pulse electrothermal ice detachment apparatus, in accord with an embodiment.

FIG. 2A shows a portion A of a pulse electrothermal ice detachment apparatus 20 (see FIG. 3, FIG. 4). A refrigeration unit (not shown) that includes apparatus 20, flows a coolant 8 through tube 4. Heat transfers from the refrigeration unit to coolant 8. Cooling fin 2 is in thermal contact with tube 4 to facilitate heat transfer. Ice 6(1) may condense from water vapor onto surfaces of tube 4 and/or fin 2. Ice 6(1) impedes the heat transfer. Apparatus 20 periodically detaches ice 6(1) from surfaces of tube 4 and/or fin 2, thus promoting cooling efficiency. FIG. 2B shows portion A after ice 6(1) has been detached from tube 4 and fin 2.

FIG. 3 shows a pulse electrothermal ice detachment apparatus 20(1). FIG. 3 may not be drawn to scale. Coolant 8 (see FIG. 2A, FIG. 2B) flows through coolant tubes 4(1); cooling fins 2(1) that are in thermal contact with tubes 4(1) facilitate heat transfer to the coolant. Coolant tubes 4(1) and cooling fins 2(1) may be made, for example, of copper, aluminum or their alloys. The location marked A is representative of portion A that is illustrated in FIG. 2A and FIG. 2B. Ice 6(1) (see FIG. 2A, FIG. 2B) may grow on either or both of coolant tubes 4(1) and fins 2(1). In apparatus 20(1), fins 2(1) are an example of heater 10, FIG. 1. Only a few fins 2(1) are labeled in FIG. 3, for clarity of illustration. Fins 2(1) are electrically conductive, and connect in a serpentine configuration, as shown, among switches 12(1) and 12(2) and ground 16. Tubes 4(1) may be formed of electrical insulators or conductors; but if formed of conductors, tubes 4(1) are substantially electrically insulated from fins 2(1). Electrical insulation between tubes 4(1) and fins 2(1) may be achieved, for example, by interposing a material such as a metal oxide (e.g., an anodized coating), a polymer, a composite material, and/or other dielectric between tubes 4(1) and fins 2(1). Fins 2(1) form heater sections 7(1) and 7(2).

When ice detachment is desired, switches 12(1) and/or 12(2) close, applying electrical power that is available at terminals 18(1) and 18(2) to heater sections 7(1) and/or 7(2), respectively. The electrical power generates heat in fins 2(1), detaching ice 6(1). In apparatus 20(1), tubes 4(1) are not directly (e.g., electrically) heated, but ice on tubes 4(1) detaches because tubes 4(1) are heated through their thermal contact with fins 2(1). The organization of fins 2(1) into two heater sections 7(1) and 7(2) is exemplary only, it is appreciated that in other embodiments, fins may be organized into only one heater section or into more than two heater sections.

A refrigeration unit that includes pulse electrothermal ice detachment apparatus 20(1) may evacuate coolant 8 from tubes 4(1) prior to ice detachment by closing a valve connected to a coolant source but continuing to run a refrigeration compressor. Evacuating coolant from tubes 4(1) prior to ice detachment may be advantageous because the heat generated during ice detachment acts on the thermal mass of tubes 4(1) and fins 2(1) alone, the heat is not wasted on heating the coolant. Not heating the coolant speeds ice detachment and decreases the overall heat that must be applied, therefore reducing power required to re-cool the coolant as refrigeration resumes.

It is appreciated that other processes of a refrigeration or freezer unit that utilize apparatus 20(1) may coordinate with ice detachment. For example, if a refrigeration or freezer unit utilizes fans to transfer heat to apparatus 20(1), the fans may shut down during ice detachment. If individual fans are disposed adjacent to sections (e.g., sections 7(1) or 7(2)) undergoing ice detachment, fan(s) adjacent a section undergoing ice detachment may shut down while fan(s) adjacent other sections continue to operate.

FIG. 4 shows a pulse electrothermal ice detachment apparatus 20(2). FIG. 4 may not be drawn to scale. Coolant 8 (see FIG. 2A, FIG. 2B) flows through coolant tube 4(2); cooling fins 2(2) that are in thermal contact with tube 4(2) facilitate heat transfer to the coolant. Only a few fins 2(2) are labeled in FIG. 4, for clarity of illustration. Coolant tubes 4(2) and cooling fins 2(2) may be made, for example, of copper, aluminum or their alloys. The location marked A is representative of portion A that is illustrated in FIG. 2A and FIG. 2B. Ice 6(1) (see FIG. 2A, FIG. 2B) may grow on either or both of coolant tubes 4(2) and fins 2(2). In apparatus 20(2), tube 4(2) is an example of heater 10, FIG. 1. Tube 4(2) connects among switches 12(3), 12(4) and 12(5) and ground 16. Fins 2(2) may be formed of electrical insulators or conductors; but if formed of conductors, fins 2(2) are substantially electrically insulated from tube 4(2). Electrical insulation between tube 4(2) and fins 2(2) may be achieved, for example, by interposing a material such as a metal oxide (e.g., an anodized coating), a polymer, a composite material, and/or other dielectric between tube 4(2) and fins 2(2). Tube 4(2) forms heater sections 7(3), 7(4) and 7(5).

When ice detachment is desired, switches 12(3), 12(4) and/or 12(5) close, applying electrical power that is available at terminal 18(3) to heater sections 7(3), 7(4) and/or 7(5), respectively. The electrical power generates heat in tube 4(2), detaching ice 6(1). In apparatus 20(2), fins 2(2) are not directly (e.g., electrically) heated, but ice on fins 2(2) detaches because fins 2(2) are heated through their thermal contact with tube 4(2). The organization of tube 4(2) into three heater sections 7(3), 7(4) and 7(5) is exemplary only, it is appreciated that in other embodiments, tubes may be organized into fewer or more than three heater sections.

Like apparatus 20(1) discussed above, a refrigeration unit that includes apparatus 20(2) may evacuate coolant 8 prior to ice detachment, to avoid wasting heat on heating the coolant. In one alternative, since sections 7(3), 7(4) and 7(5) are defined as sections of tube 4(2), valves and tubes may be provided to allow coolant to continue flowing through sections that are not being defrosted, and isolation and/or evacuation of coolant from sections that are being defrosted. It is appreciated that other features operating in a refrigeration or freezer unit that utilizes apparatus 20(2) (such as fans, as discussed above in connection with apparatus 20(1)) may coordinate with ice detachment.

In another alternative, apparatus 20(2) may detach ice in sections such that the sections "follow" movement of coolant through tube 4(2). For example, in the embodiment of FIG. 4, coolant may normally move in sequence through sections 7(3), 7(4) and 7(5). A speed at which coolant moves through tube 4(2) can be determined from the refrigeration system design of a unit that includes apparatus 20(2). While coolant flows normally through tube 4(2), apparatus 20(2) may apply a first pulse of electrical power to section 7(3); a duration of the first pulse is sufficient to detach ice from section 7(3). Coolant in section 7(3) will absorb some of the heat generated by the first pulse. Apparatus 20(2) may subsequently apply a second pulse of electrical power to section 7(4) after a time delay that is arranged using knowledge of the speed at which coolant moves through tube 4(2), such that coolant that was in section 7(3) during the first pulse is in section 7(4) during the second pulse. The heat absorbed by coolant in section 7(3) during the first pulse helps to heat section 7(4) during the second pulse, and may decrease a duration of the second pulse that is required to detach ice from section 7(4). Apparatus 20(2) may subsequently apply a third pulse of electrical power to section 7(5) after a time delay that is arranged using knowledge of the speed at which coolant moves through tube 4(2), such that coolant that was in section 7(4) during the second pulse is in section 7(5) during the third pulse. The heat absorbed by coolant in sections 7(3) and 7(4) during the first and second pulses helps to heat section 7(4) during the third pulse and may decrease a duration of the third pulse that is required to detach ice from section 7(5). It is appreciated that the method described herein may be repeated for any number of sections through which coolant flows in series.

Figure 5:
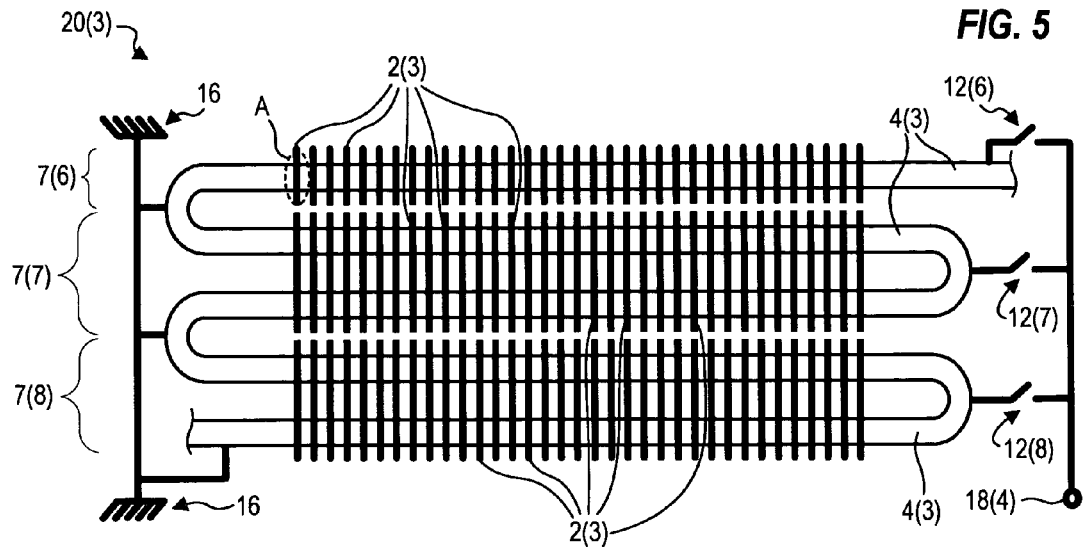
FIG. 5 shows one pulse electrothermal ice detachment apparatus, in accord with an embodiment.

FIG. 5 shows a pulse electrothermal ice detachment apparatus 20(3). FIG. 5 may not be drawn to scale. Coolant 8 (see FIG. 2A, FIG. 2B) passes through coolant tube 4(3); cooling fins 2(3) that are in thermal contact with tube 4(3) facilitate heat transfer to the coolant. Only a few fins 2(3) are labeled in FIG. 5, for clarity of illustration. Coolant tubes 4(3) and cooling fins 2(3) may be made, for example, of copper, aluminum or their alloys, or of other materials having low thermal resistivity. The location marked A is representative of portion A that is illustrated in FIG. 2A and FIG. 2B. Ice 6 (see FIG. 2A, FIG. 2B) may grow on either or both of coolant tubes 4(2) and fins 2(2). In apparatus 20(3), tube 4(3) is an example of heater 10, FIG. 1. Tube 4(3) connects among switches 12(6), 12(7) and 12(8) and ground 16 to form heater sections 7(6), 7(7) and 7(8). Fins 2(3) may be formed of electrical insulators or conductors; if formed of conductors, fins 2(3) may be electrically connected with tube 4(3), but fins 2(3) connect only within a common heater section and thus are positioned substantially at equipotentials across the heater section. As desired for ice detachment, switches 12(6), 12(7) and/or 12(8) close, applying electrical power that is available at terminal 18(4) to heater sections 7(6), 7(7) and/or 7(8), respectively. The electrical power generates heat in tube 4(3), detaching ice 6. In apparatus 20(3), electrical heating of fins 2(3) may occur but is incidental, because little current passes through fins 2(3) even if electrically conductive and connected with tube 4(3). Ice on fins 2(3) detaches (i.e., either loosens, or completely melts and/or vaporizes, as discussed above in connection with FIG. 1) primarily because fins 2(3) are heated through their thermal contact with tube 4(3). The organization of tube 4(3) into three heater sections 7(6), 7(7) and 7(8) is exemplary only, it is appreciated that in other embodiments, tubes may be organized into fewer or more than three heater sections.

Like refrigeration units including apparati 20(1) and 20(2) discussed above, a refrigeration unit including apparatus

20(3) may evacuate coolant 8 prior to ice detachment, to avoid wasting heat on heating the coolant. In one alternative, since sections 7(6), 7(7) and 7(8) are defined as sections of tube 4(2), valves and tubes may be provided to allow coolant to continue flowing through sections that are not being defrosted, and isolation and/or evacuation of coolant from sections that are being defrosted. Other features operating in a refrigeration or freezer unit that utilizes apparatus 20(3) (such as fans, as discussed above in connection with apparati 20(1) and 20(2)) may coordinate with ice detachment. Ice detachment may be performed in sequential sections timed so that ice detachment "follows" coolant through the sections, as described above in connection with apparatus 20(2).

EXAMPLE #1

A pulse electrothermal ice detachment apparatus including a single, one-meter tube was built and tested. The tube was formed of copper with an outer diameter of 1 cm and an electrical resistance of 1.4 mohm. The apparatus included 200 aluminum fins, each fin having a thickness of 0.19 mm and an area of 4 cm by 4 cm; the fins were spaced 4 mm apart on the tube. Cold glycol at T=−10 C flowed through the tube, cooling it and causing frost to form on the tube and fins. A pulse of DC electric power at a voltage of 1.4V and a current of 1000 A, 4 to 5 seconds long, detached (in this case, melted) all of the frost that had formed on the apparatus.

Figure 6:
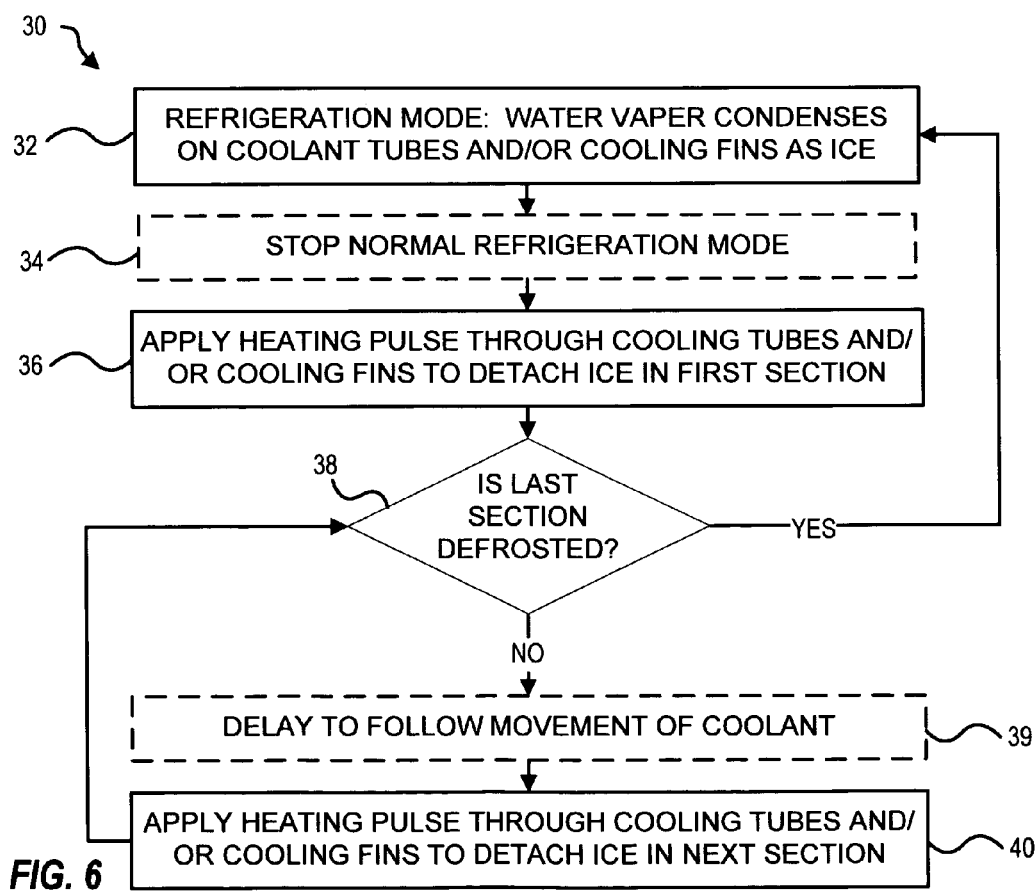
FIG. 6 is a flowchart of a process for detaching ice from coolant tubes and/or cooling fins of a refrigeration unit, in accord with an embodiment.

FIG. 6 is a flowchart of a process 30 for detaching ice from coolant tubes and/or cooling fins of a refrigeration unit. Process 30 may be implemented, for example, by any of pulse electrothermal ice detachment apparati 20(1)-20(3). In step 32, the refrigeration unit operates in a refrigeration mode. A coolant at a low temperature circulates through coolant tubes, cooling the tubes and/or cooling fins; heat (e.g., heat from items being refrigerated or heat that diffuses through walls or leaks through openings in the unit) transfers to the tubes and/or to the fins from the refrigeration unit. Water vapor from air in the refrigeration unit may condense on the coolant tubes and/or cooling fins as ice. In step 34, normal refrigeration mode is halted for detaching ice. Step 34 is optional and may not occur in certain refrigeration units; for example, step 34 may not occur in units in which it is desirable to continue refrigeration in certain sections while other sections are defrosted. Step 36 applies a pulse of electrical power through coolant tubes and/or cooling fins to detach (e.g., to loosen, melt or vaporize) ice collected thereon, in a first section being defrosted. An example of step 36 is detaching ice accumulated on any of sections 7(1) through 7(8) by closing the corresponding switch 12(1)-12(8). Step 38 determines whether detaching ice is complete or whether additional sections of coolant tubes and/or fins should be defrosted. If detaching ice is complete, method 30 resumes normal refrigeration mode in step 32. If additional sections are to be defrosted, an optional delay step 38 allows coolant that has absorbed heat in defrosting of one section to move to the next section, and step 40 defrosts the next section, then method 30 returns to step 38 to repeat the determination of whether detaching ice is complete.

Figure 7:
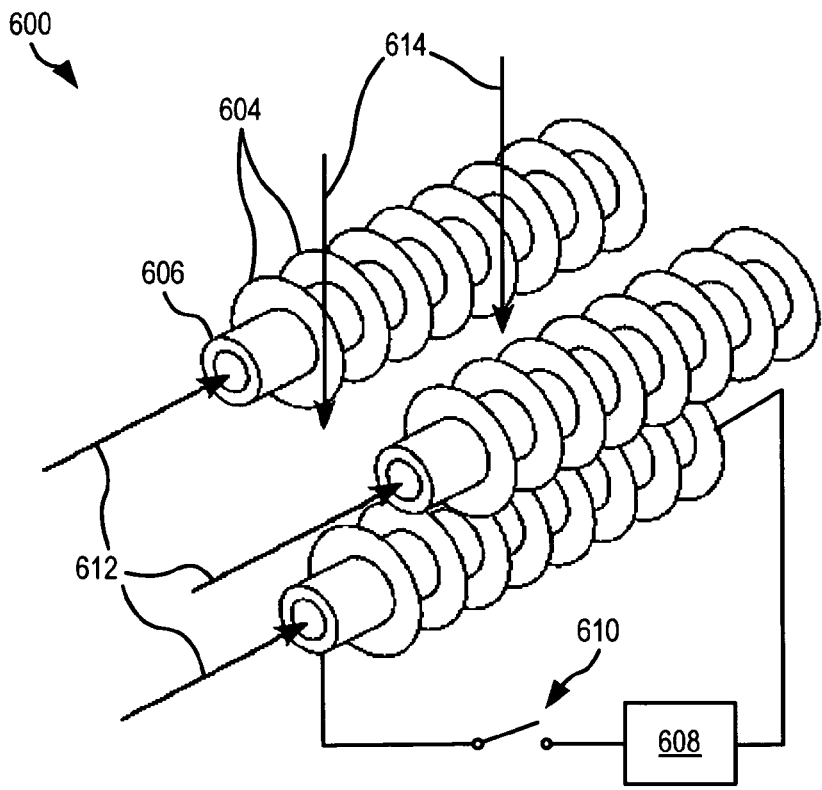
FIG. 7 shows one embodiment of a heat exchanger having an array of fins mounted upon tubes.

FIG. 7 shows one embodiment of a heat exchanger 600 having an array of tube and fin assemblies 620, each assembly 620 having fins 604 mounted upon a tube 606, as shown. In normal operation, a gas to be cooled flows in the direction of arrows 614, while coolant flows through tubes 606 in the direction of arrows 612. Each tube 606 connects to a power source 608 through a switch 610 such that when switch 610 is closed, current flows through tube 606 to generate heat; thereby operating to de-ice heat exchanger 600. In FIG. 7, only one tube 606 is shown with electrical connections, for clarity of illustration. When a short current pulse passes through tubes 606, Joule-heat is generated within the walls of tubes 606. Since there is a very low thermal resistance between tubes 606 and fins 604, a high rate of heat diffusion occurs in fins 604. Thus, Joule-heat generated in tubes 606 quickly propagates into fins 604, melting ice or/and frost grown on heat exchanger 600.

Figure 8:
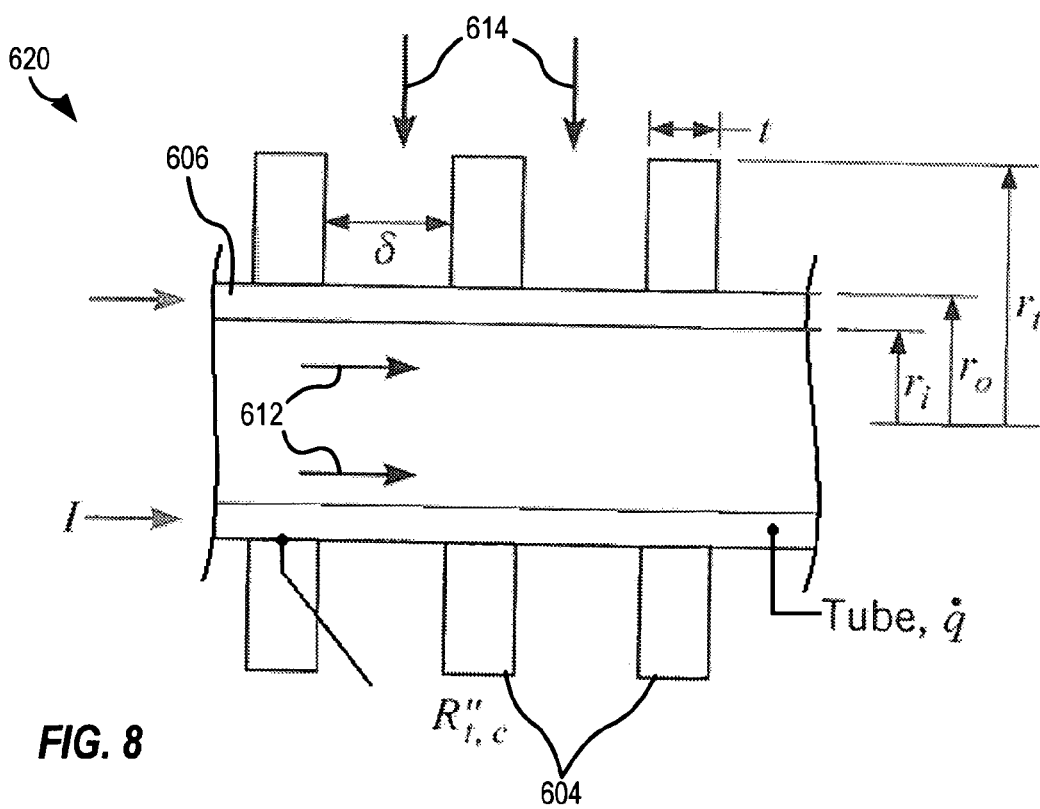
FIG. 8 shows a cross section through one tube and fin assembly.

FIG. 8 shows a cross section through one tube and fin assembly 620 of FIG. 7, and shows certain geometric definitions utilized in heat transfer calculations. The following example illustrates the rate of heat diffusion. The heat diffusion length in some material, $L_D$, is given by:

$$L_D(t) \approx 2 \cdot \sqrt{\alpha \cdot t} \qquad \text{Eq. 15}$$

where $$\alpha = \frac{k}{\rho \cdot C_P} \qquad \text{Eq. 16}$$

where t is time, $\alpha$ is a thermal diffusivity of the material, κ is the material's thermal conductivity, ρ is the material's density, and $C_P$ is the material's heat capacity.

Figure 9:
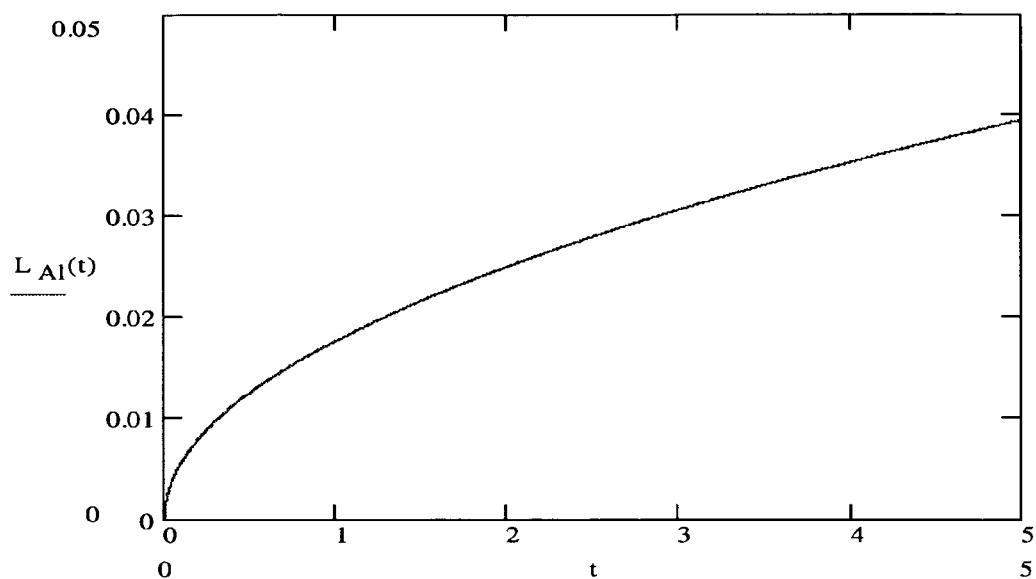
FIG. 9 shows a chart illustrating heat-diffusion length versus time for pure aluminum at room temperature.

FIG. 9 shows a chart illustrating heat-diffusion length (m) versus time (s) for pure aluminum at room temperature. In particular, FIG. 9 shows that heat diffuses in aluminum over 1.8 cm in one second, and over 3.9 cm in five seconds. Thus, this diffusion length is sufficient to heat a fin 604 (where fin 604 is of a typical size) in about one second when the heat is generated inside tube 606.

This embodiment facilitates use within a wide range of heat exchangers currently employed in the refrigeration industry. For example, shape of fins 604 may be one or more of: annular, square, pin-like, etc. Fins 604 and tubes 606 may be made of one or more of: aluminum, copper, stainless steel, conductive polymers, or other alloy. Stainless steel tubes, for example, may be used to facilitate resistive heating because stainless steel has relatively high electrical resistance. Other metals and alloys may also be used.

Power supply 608 may be any DC or AC power supply that can supply sufficient power; in certain embodiments power supply 608 is a low voltage, high current power supply. For example, power supply 608 may be one or more of: a battery, a bank of super-capacitors, a step-down transformer, an electronic step-down transformer, etc. In one embodiment, power supply 608 produces a high-frequency current that is beneficial since the electrical resistance of tubes 606 may be increased due to the skin effect when carrying high frequency current.

To generate more uniform electric heating, fins 604 may be electrically isolated from tubes 606 while maintaining a good thermal contact with tubes 606. For example, a thin anodized layer on the aluminum surface, a thin layer of a polymer, or an epoxy adhesive may form such thin electrical insulation.

As illustrated in the above example, such pulse heating limits heat loss due to convective heat exchange with a liquid refrigerant in the base tube and to the air on the outer surface of the heat exchanger. Minimizing this heat loss reduces average power requirements and enables de-icing and defrosting without shutting down heat exchanger 600 (i.e., without shutting down the freezer, cooler, or air-conditioner). By applying a heating pulse with sufficient frequency, thin layers of ice or frost grown on the fins and outer-surface of the tube are melted, thus maintaining the heat-exchanger surfaces virtually ice and frost free. Such pulse heating may thus improve performance and reliability of the heat exchanger (by reducing startup and shutdown cycles required), Such pulse heating may, further, reduce power required for de-icing and may increase shelf-life of food stored in a refrigerator by minimizing temperature fluctuations during de-icing.

Consider heat exchanger 600 of FIG. 7 made of aluminum and having typical dimensions: a tube 606 inner diameter of 1 cm, a tube 606 wall thickness of 0.30 mm, fin 604 diameters of 36 mm, fin 604 thicknesses of 0.5 mm, and spaces between the fins 604 of 4 mm. Such a heat exchanger has a mass of about 330 g/m (per meter length of tube 606) and a total surface area (fins 604+outer surface of tube) of 0.47 m²/m (square meters per meter length of the tube). Assume that the temperature of refrigerant in tube 606 is −18° C., a convective heat-exchange rate at the inner surface of tube 606 is 1000 W/(m2·K), ambient air temperature is +5° C. and a convective heat-exchange coefficient between the air and the outer surface of heat exchanger 600 is 65 W/(m²·K).

Figure 10:
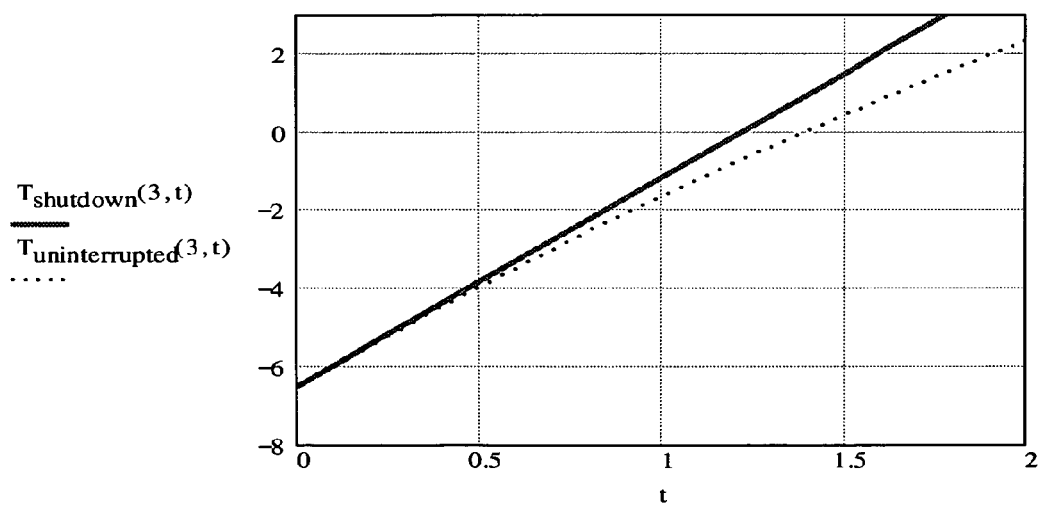
FIG. 10 shows a chart illustrating temperature versus time for an aluminum heat exchanger when (a) powered by a heating pulse during operation and (b) powered by a heating pulse with cooling pump and fans off.

As shown in FIG. 10, if a 3 V/m electric field is applied to tube 606, it would take less then 1.4 second to heat the surface of aluminum above 0° C. Once the surface of the aluminum is above 0° C., any ice or frost formed on the surface of the aluminum starts to melt.

| Item | Symbol | Value |
| --- | --- | --- |
| Tube length | L | 1 m |
| Tube inner diameter | $r_i$ | 4.85 mm |
| Tube outer diameter | $r_o$ | 5 mm |
| Fin outer diameter | $r_t$ | 36 mm |
| Fin thickness | $t_f$ | 500 μm |
| Space between fins | δ | 4 mm |
| Inner surface area of tube | $A_i$ | 0.03 m² |
| Area in contact with air | $A_0$ | 0.47 m² |
| Aluminum volume | $V_{Al}$ | 1.22 · 10⁻⁴ m³ |
| Thermal conductivity of Aluminum | $k_{Al}$ | 200 W/(m · K) |
| Density of Aluminum | $\rho_{Al}$ | 2700 kg/m³ |
| Heat capacity of Aluminum | $C_{Al}$ | 0.95 · 10³ J/(kg · K) |
| Thermal diffusivity of Aluminum | $D_{Al}$ | $k_{Al}/(\rho_{Al} \cdot C_{Al})$ |
| Lump-heat capacitance of the heat exchanger | $C_t$ | $\rho_{Al} \cdot C_{Al} \cdot V_{Al}$ |

Boundary Conditions

| Item | Symbol | Value |
| --- | --- | --- |
| Convective heat-exchange coefficient on tube inner surface | $h_f$ | 1000 W/(m₂ · K) |
| Average convective heat exchange coefficient on outer surface of heat exchanger | $h_{air}$ | 65 W/(m₂ · K) |
| Refrigerant temperature | $T_f$ | −18° C. |
| Air temperature | $T_{air}$ | 5° C. |
| Biot number in the problem | $B_i$ | $h_f \cdot (r_t-r_i)/k_{Al}$ = 0.066 |
| Mean initial temperature of Aluminum | $T_{Al}$ | −6.488° C. |

Electrical Parameters

| Item | Symbol | Value |
| --- | --- | --- |
| Aluminum resistivity | $\rho_e$ | 2.5 · 10⁻⁸ ohm · m |
| Tube electrical resistance | $R_e$ | 5.386 · 10⁻³ ohm |
| Voltage range applied to tube | V | Variable |
| Resistive heat generation rate | W(V) | $V^2/R_e$ Watts |
| Time range | t | variable |

| Item | Symbol | Value |
| --- | --- | --- |
| Heat exchanger temperature during Pulse-heating when heat exchanger is shutdown | $T_{shutdown}(V, t)$ | |
| Heat exchanger temperature during Pulse-heating when heat exchanger is operating | $T_{uninterrupted}(V, t)$ | |

Heat exchanger temperature during pulse-heating when heat exchanger is shutdown is determined by:

$$T_{shutdown}(V, t) = \frac{T_{Al} \cdot C_t + t \cdot (W(V))}{C_t},$$

and heat exchanger temperature during pulse-heating when heat exchanger is operating without interruption is determined by:

$$T_{uninterrupted}(V, t) = \frac{C_1(V)}{C_2} - \left(\frac{C_1(V)}{C_2} - T_{Al}\right) \cdot \exp\left(\frac{-C_2}{C_t} \cdot t\right)$$

where $$C_1(V) = W(V) + h_f \cdot A_i \cdot T_f + h_{air} \cdot A_0 \cdot T_{air}$$

and $$C_2 = h_f \cdot A_i + h_{air} \cdot A_0$$

FIG. 10 shows a chart illustrating simulated temperature versus time for heat exchanger 600 according to the assumptions listed above, when powered by a heating pulse during operation and when powered by a heating pulse with cooling pump and fans off. In particular, FIG. 10 shows that defrosting may be successfully performed without shutting down the coolant pump or fans since it takes less than 1.4 seconds to start frost melting during uninterrupted operation. In this example, 3V is applied to a 1 meter section of heat exchange tube (e.g., tube 606) generating 1.671 kW of heating power. The tube conducts 557.004 A with 3V applied.

Figure 11:
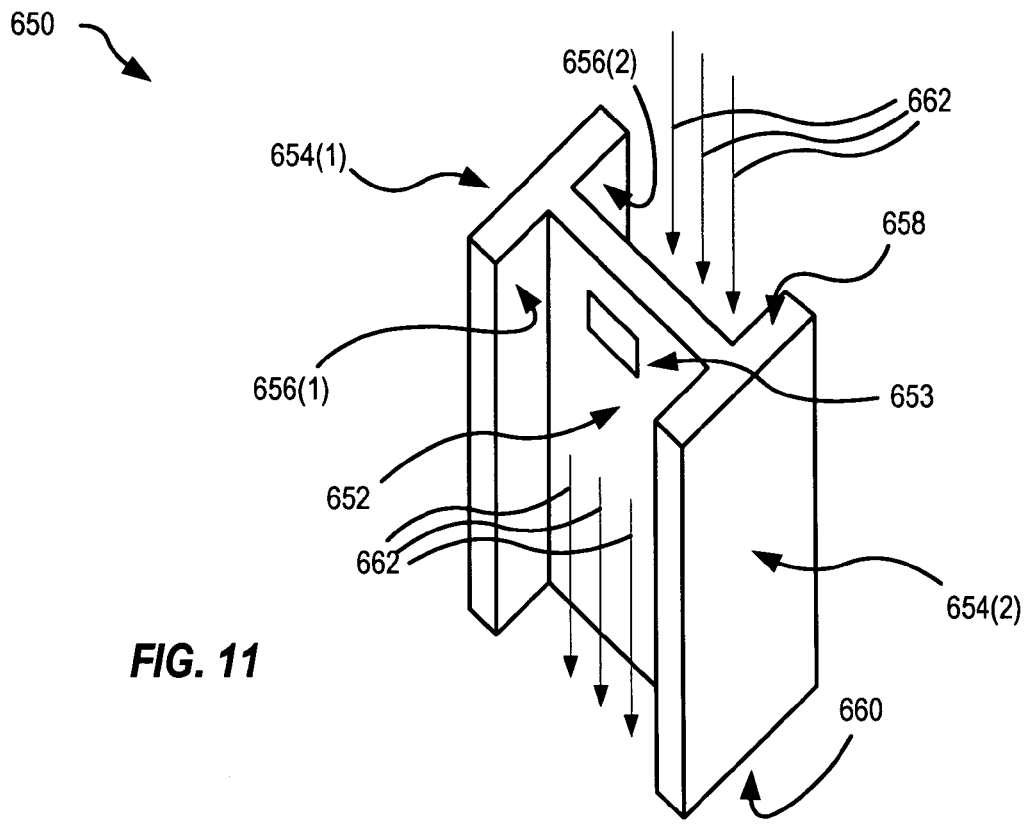
FIG. 11 shows, in perspective view, one heat exchanger configured as a pulse system for detaching ice, in accord with an embodiment.

FIG. 11 shows, in perspective view, a heat exchanger 650 configured as a pulse system for detaching ice. Heat exchanger 650 may be formed, for example, of metal or an electrically and thermally conductive polymer. Surfaces 654(1) and 654(2) are cooled by a circulating coolant. Air circulates in the direction of arrows 662 past cooling surfaces 652, 656(1) and 656(2), and corresponding cooling surfaces opposite surface 652 and surface 654(2) that are hidden in this view. Heat passes from the air to the cooling surfaces of the heat exchanger, then passes to the coolant; ice may form on the cooling surfaces. A thin-film ice detector 653 may attach to one or more of the cooling surfaces, for example, cooling surface 652, for detecting the presence of the ice and/or frost, and may measure the thickness of the ice or frost. A top surface 658 and a bottom surface 660 are thermally insulated so that ice does not form thereon.

Figure 12:
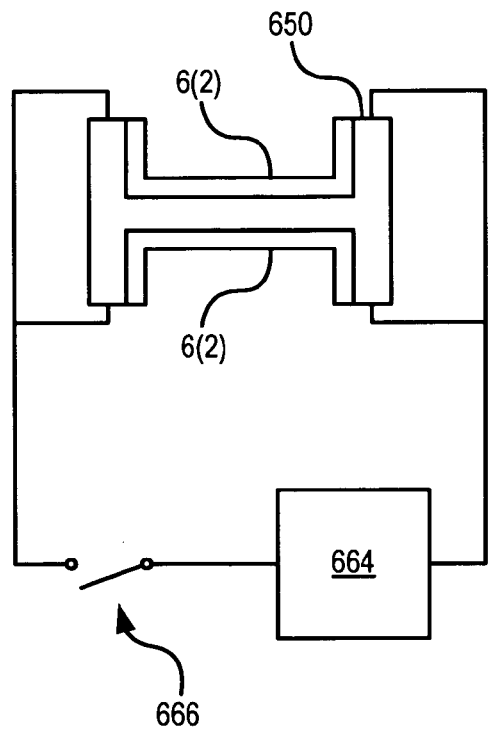
FIG. 12 shows a top view of the heat exchanger of FIG. 11 with accumulated ice and with connections to a power supply and a switch.

FIG. 12 shows a top view of heat exchanger 650 with accumulated ice 6(2) and with connections to a power supply 664 and a switch 666. In operation, heat exchanger 650 cools air and may accumulate ice 6(2). Switch 666 then closes, sending a heating pulse of electrical current through heat exchanger 650; power and duration of the heating pulse can be controlled to melt an ice-object interface before significant heat from the pulse dissipates into ice 6(2) and the cooling surfaces of heat exchanger 650. If heat exchanger 650 is oriented vertically (e.g., as shown in FIGS. 11 and 12), gravity can cause ice 6(2) to slide off heat exchanger 650 after a heating pulse is applied.

Figure 13:
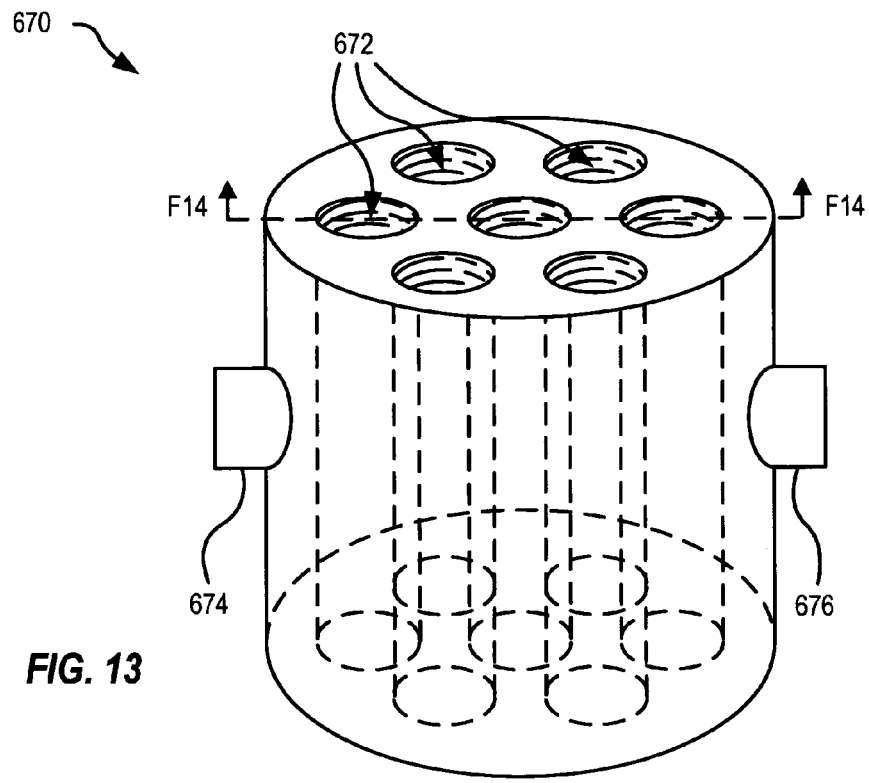
FIG. 13 shows one heat exchanger configured as a pulse system for detaching ice, in accord with an embodiment.

FIG. 13 shows a heat exchanger 670 configured as a pulse system for detaching ice. Heat exchanger 670 forms air channels 672 where heat passes from air to coolant that enters exchanger 670 at inlet 674 and exits exchanger 670 at outlet 676. Dashed line F14-F14 indicates the top of a cross-sectional plane shown in FIG. 14.

Figure 14:
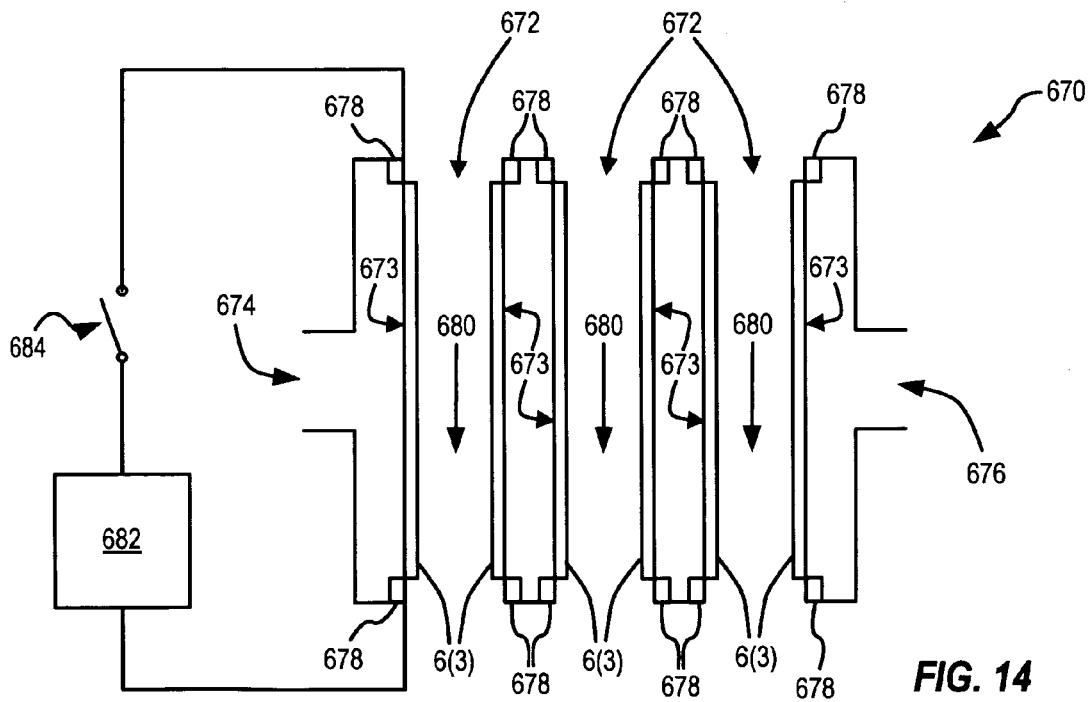
FIG. 14 shows a cross-sectional view of the heat exchanger of FIG. 13.

FIG. 14 shows a cross-sectional view of heat exchanger 670 taken from a plane extending vertically downward from dashed line F14-F14 in FIG. 13. Air flows through heat exchanger 670 in the direction of arrows 680. Cooling surfaces 673 form the sides of air channels 672, and a layer of thermal insulation 678 insulates a top and a bottom of each air channel 672, as shown. Each cooling surface 673 connects with a power supply 682 through a switch 684 (only one cooling surface 673 is shown as connected, for clarity of illustration).

In operation, heat exchanger 670 cools air and may accumulate ice 6(3) on cooling surfaces 673. Switch 684 may then close, sending a heating pulse of electrical current through each of cooling surfaces 673; the power and duration of the heating pulse is controlled to melt an ice-object interface before significant heat from the pulse dissipates into ice 6(3) into coolant, and cooling surfaces 673. If heat exchanger 670 is oriented vertically (e.g., as shown in FIGS. 13 and 14), gravity can cause ice 6(3) to slide off cooling surfaces 673 after a heating pulse is applied.

It will be appreciated that modifications of heat exchangers 650 and 670 are within the scope of this disclosure. For example, cooling surfaces of heat exchanger 650 may be shaped differently from the shapes shown in FIG. 11 and FIG. 12; coolant may run through tubes or channels of heat exchanger 650. Instead of connecting cooling surfaces to power supplies, heating foils or films may be disposed on a dielectric layer adjacent to cooling surfaces of heat exchangers 650 or 670. Spaces may be sealed between a heating foil or film and a cooling surface, and the spaces may be alternately evacuated to bring the heating foil or film into thermal contact with the cooling surface, and pressurized to develop an air gap between the heating foil or film and the cooling surface during ice detachment. Cooling surfaces may form sections (e.g., like heat exchangers 20(1), 20(2) and 20(3)), such sections may form electrical connections to switches and power supplies such that not all sections receive a heating pulse at a given time.

Figure 15:
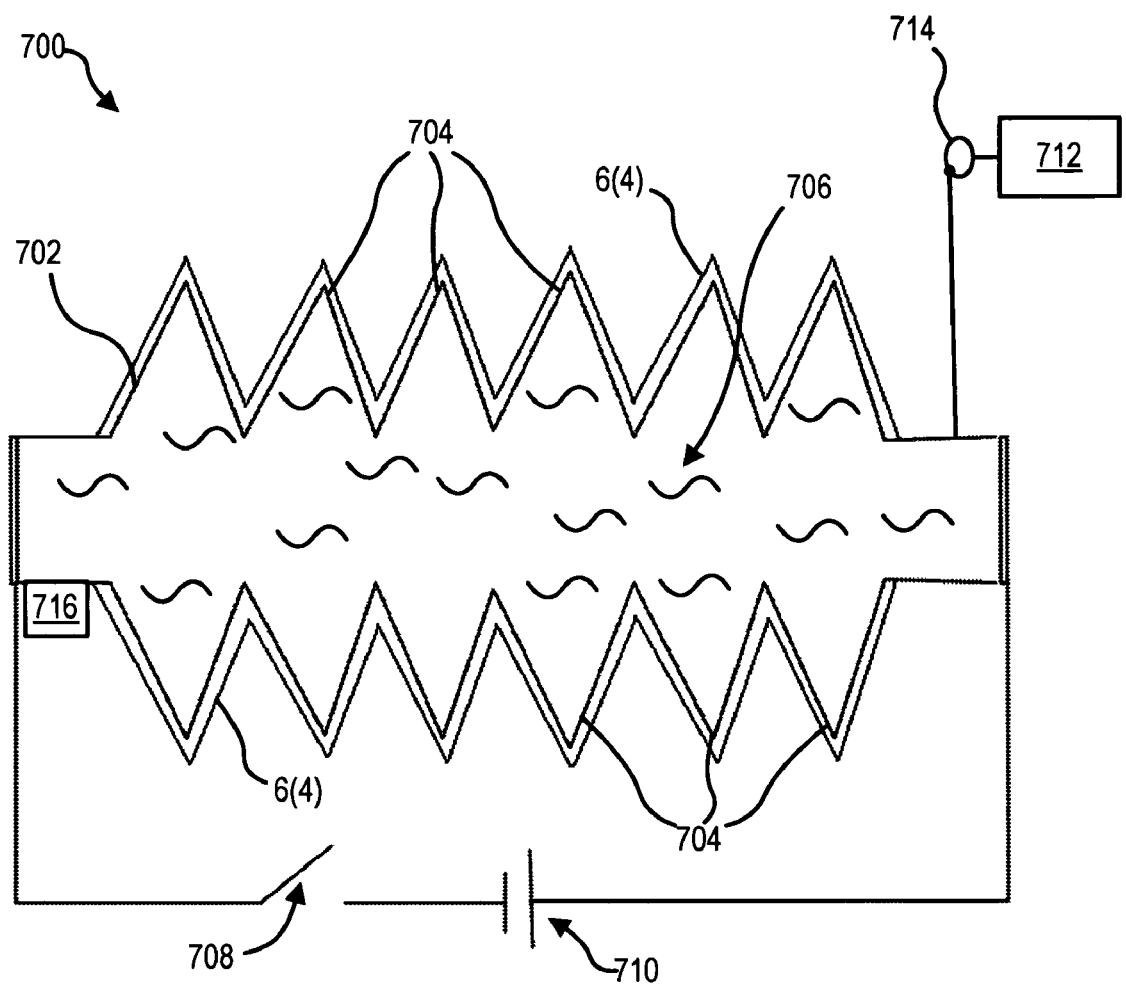
FIG. 15 shows an accordion type heat exchanger configured as a pulse system for detaching ice, in accord with an embodiment.

FIG. 15 shows a schematic cross-sectional view of an accordion type heat exchanger 700 configured as a pulse system for detaching ice. In heat exchanger 700, coolant 706 (Freon, or other liquid) flows through a coolant tube 702 having cooling fins 704 that form heat exchanging surfaces, exchanging heat with surrounding air. Although coolant tube 702 is shown as having coolant within fins 704, certain embodiments may have a coolant tube that has heat exchanging surfaces extending laterally from a straight tube or pipe (see, for example, FIG. 17). In other embodiments, a tube or pipe may assume a serpentine or zigzag shape to form heat exchanging surfaces (see, for example, FIG. 19). Ice 6(4) that may form on cooling fins 704 can be removed through pulse deicing. A power supply 710 sends a heating pulse of electric current through heat exchanger 700 when a switch 708 closes; the heating pulse melts at least an ice-object interface formed between fins 704 and ice 6(4); the heating pulse may also melt all of ice 6(4). A typical density of heating per unit area may be from about 5 KW/m$^2$ to about 100 KW/m$^2$. Current magnitude and pulse duration may be adjusted based on temperature, flow rate and coolant properties (e.g., density, heat capacity and thermal conductivity). A typical pulse duration may be from about 0.1 s to 10 s. Power supply 160 may be a regular AC power outlet, or a DC power supply such as a battery, a capacitor or an ultracapacitor. Switch 708 may be a semiconductor type (power-MOSFET, IGBT, thyristor etc.), a mechanical switch, an electromagnetic switch, or any combination of the above. Solid ice 6(4) remaining after the heating pulse may then be removed by gravity (e.g., ice 6(4) may slide off of fins 704) or by mechanical action such as scraping, shaking or air blowing against heat exchanger 700. Shaking can be provided by an optional small electric motor 712 and a crankshaft 714, by an optional electromagnetic vibrator 716, or by inducing pressure oscillations into coolant 706, for example.

Figure 16:
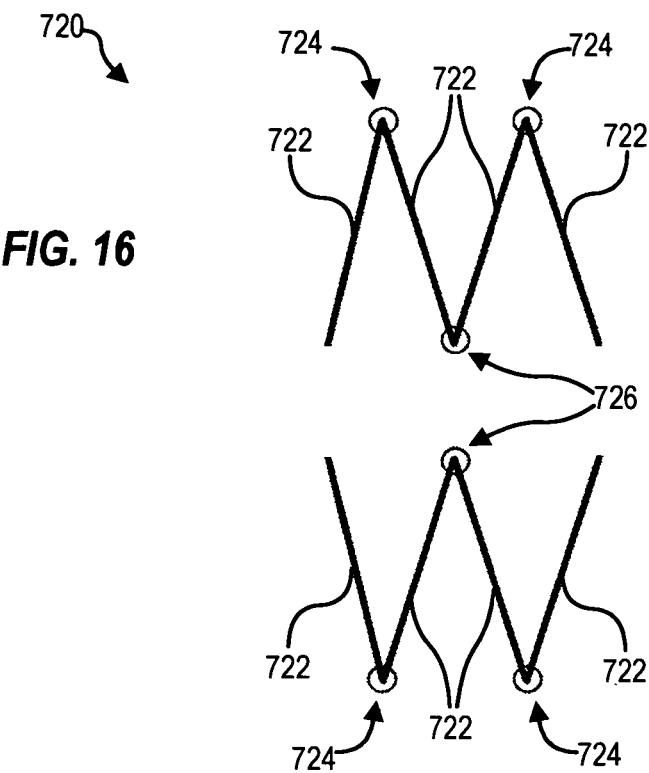
FIG. 16 shows a cross-sectional view of foil washers attached to form a coolant tube.

FIG. 16 shows a cross-sectional view of foil washers 722 attached to form a coolant tube 720. Coolant tube 720 may be used, for example, as coolant tube 702 (see FIG. 15). Foil washers 722 may be, for example, 4 mil stainless steel foil washers having inner diameters of 1 inch and outer diameters of 3 inches, and are either soldered or spot-welded at their outer edges 724 and their inner edges 726. Each washer 722 thus forms a heat exchanging surface (e.g., a pair of washers forms one cooling fin 704, FIG. 15).

Figure 17:
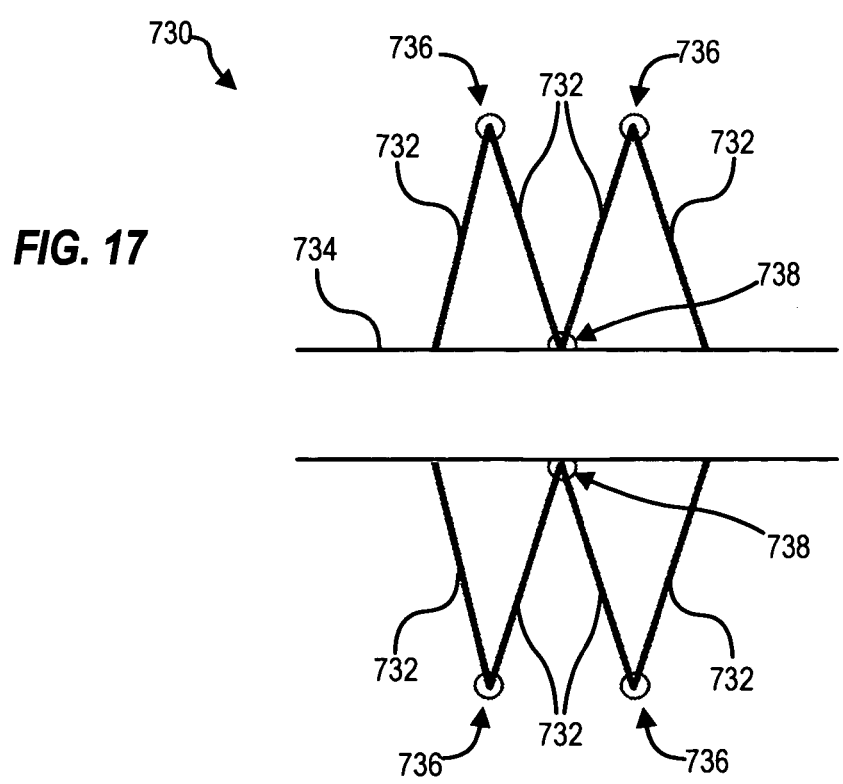
FIG. 17 shows a cross-sectional view of foil washers attached to a straight pipe to form a coolant tube.

FIG. 17 shows a cross-sectional view of foil washers 732 attached to a straight pipe 734 to form a coolant tube 730. Coolant tube 730 may be used, for example, as coolant tube 702 (see FIG. 15). Foil washers 732 may be, for example, 4 mil stainless steel foil washers having inner diameters of 1 inch and outer diameters of 3 inches, and are either soldered or spot-welded at their outer edges 736 and their inner edges 738; washers 732 may also be soldered or welded to pipe 734. Each pair of washers 732 thus forms a cooling fin (e.g., cooling fin 704, FIG. 15). Relative wall thicknesses of pipe 734 and washers 732 may be chosen so that they have similar density of heating power, W, when a pulse of a current is induced as shown in FIG. 15.

Figure 18:
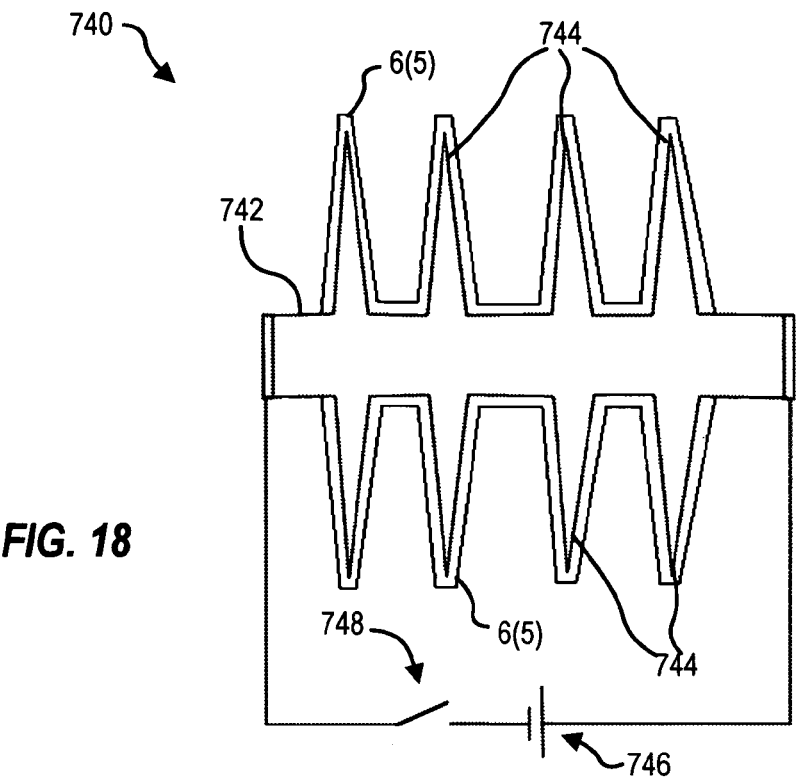
FIG. 18 shows another accordion type heat exchanger configured as a pulse system for detaching ice, in accord with an embodiment.

FIG. 18 shows another accordion type heat exchanger 740 configured as a pulse system for detaching ice. Heat exchanger 740 has a coolant tube 742 with cooling fins 744 that exchange heat with surrounding air. Ice 6(5) that may form on cooling fins 744 can be removed through pulse electrothermal ice detachment that works in a similar manner for heat exchanger 740 as for heat exchanger 720. Power supply 746 sends a heating pulse of electric current through heat exchanger 740 when a switch 748 closes; a heating pulse melts at least an ice-object interface formed between fins 744 and ice 6(5); the heating pulse may also melt or vaporize all of ice 6(5).

Figure 19:
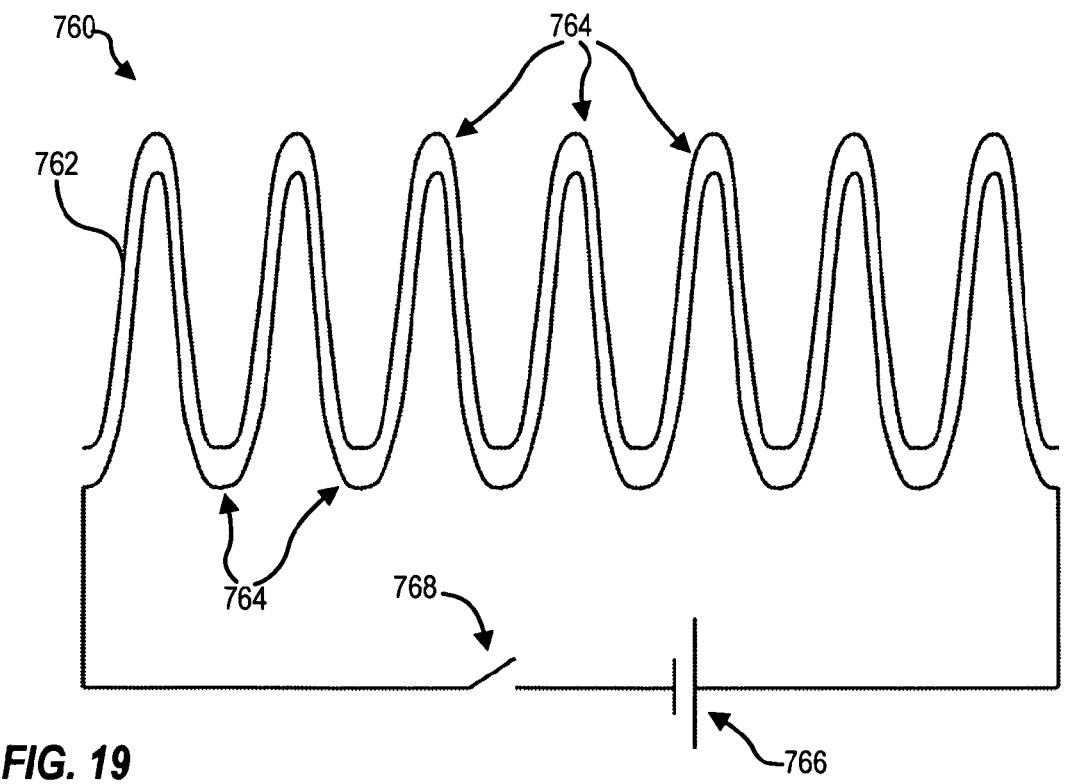
FIG. 19 shows another accordion type heat exchanger configured as a pulse system for detaching ice, in accord with an embodiment.

FIG. 19 shows another accordion type heat exchanger 760 configured as a pulse system for detaching ice. Heat exchanger 760 has a coolant tube 762 that exchanges heat with surrounding air; coolant tube 762 is of a serpentine type, with coolant flowing through bends 764 of coolant tube 762 to maximize heat exchanging surface area. Ice (not shown) that may form on coolant tube 762 can be removed through pulse electrothermal ice detachment. A power supply 766 sends a heating pulse of electric current through heat exchanger 760 when a switch 768 closes; the heating pulse melts at least an ice-object interface formed between fins 764 and ice; the heating pulse may also melt all of the ice.

It will be appreciated that modifications of heat exchangers 730, 740 and 760 are within the scope of this disclosure. For example, heat exchanging surfaces of heat exchangers 730, 740 and 760 may be shaped differently from the shapes shown in FIG. 17, FIG. 18 and FIG. 19. Instead of tubes and/or cooling fins being connected with power supplies, heating foils or films may be disposed on a dielectric layer adjacent to such surfaces. Spaces may be sealed between a heating foil or film and a heat exchanging surface, and the spaces may be alternately evacuated to bring the heating foil or film into thermal contact with the cooling surface, and pressurized to develop an air gap between the heating foil or film and the cooling surface during ice detachment. Heat exchanging surfaces may form sections such as discussed above; sections may form electrical connections to switches and power supplies such that not all sections receive a heating pulse at a given time.

Pulse-heating of thin-wall metal tubes and foils may advantageously utilize low voltage (1V to 24 V) but high current (hundreds or thousands of amperes). When direct use of higher voltage (e.g., 120 VAC or 240 VAC) is preferable, higher electrical resistance is advantageous. Higher resistance can be achieved by separating a heater conductive film from a cooling tube. For instance, a heat exchanger with fins may be made of anodized aluminum, with a thin, highly resistive heating film applied on top of the (insulating) anodized layer. The heating film can be applied by CVD, PVD, electrolysis coating, or by painting.

Figure 20:
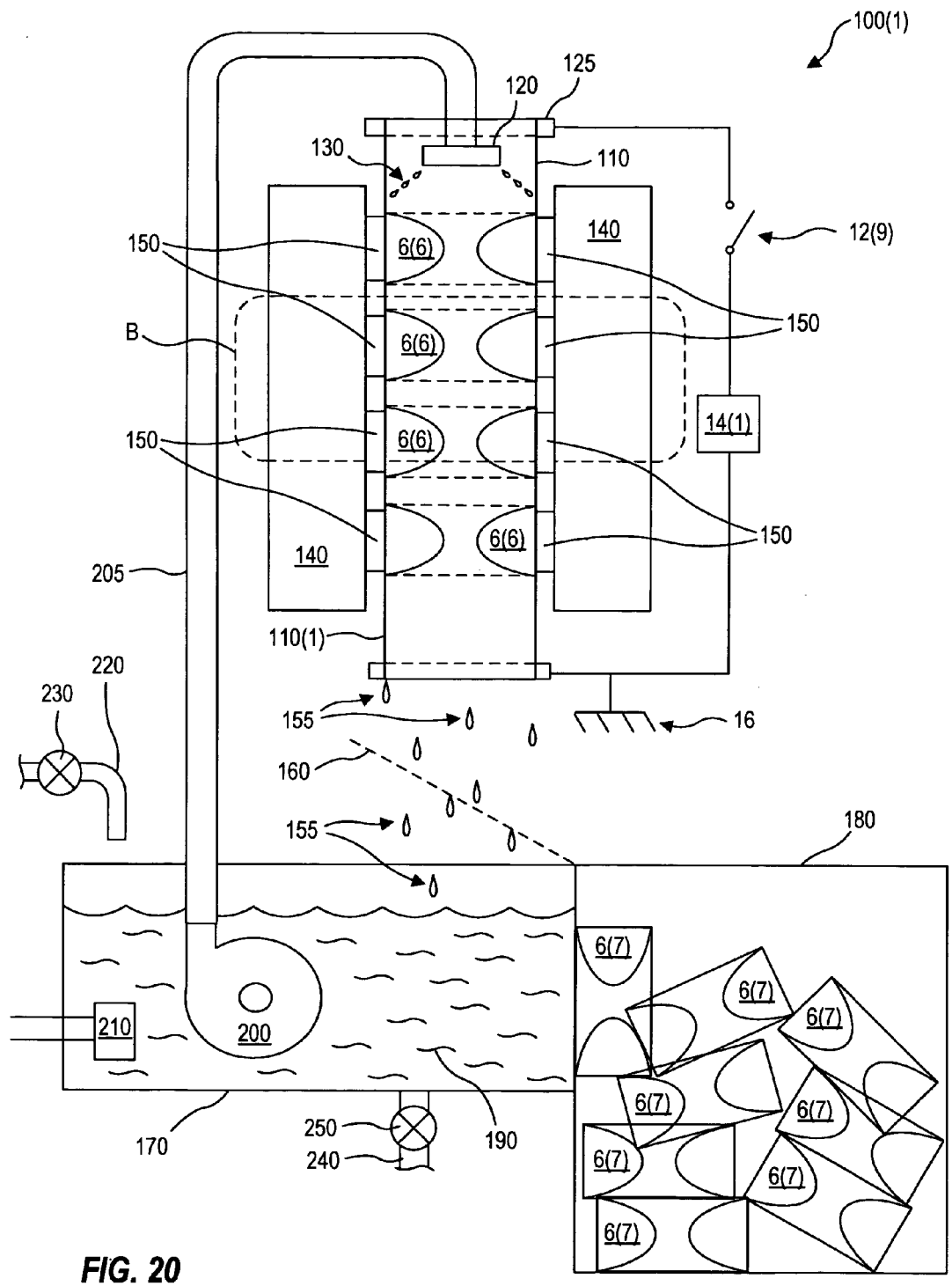
FIG. 20 shows one pulse electrothermal ice detachment apparatus configured as a tubular icemaker, in accord with an embodiment.

FIG. 20 shows a pulse electrothermal ice detachment apparatus configured as a tubular icemaker 100(1). FIG. 20 may not be drawn to scale. A portion of tubular icemaker 100(1) labeled B is shown in greater detail in FIG. 22. Icemaker 100(1) makes rings 6(6) of ice that are harvested using pulse electrothermal ice detachment as further described below. An icemaking tube 110(1) is oriented vertically in a freezer compartment (not shown). In one embodiment, tube 110(1) is about three to five inches long, has an outer diameter of about one inch and has a wall thickness of about ten mils. Tube 110(1) may be formed, for example, of stainless steel, a titanium alloy, or a composite material such as a polymer filled with carbon particles and/or fibers to make the material electrically conductive. A spray head 120 sprays water 130 onto tube 110(1). A set of heat conduction fins 140 transfers heat from through cold fingers 150 to the freezer compartment, so that ice growth regions (not labeled in FIG. 20; see FIG. 22) of tube 110(1) reach a temperature below the freezing point of water. Only two heat transfer fins 140 are shown in FIG. 20; fewer or more fins 140 may be arranged about tube 110(1) as needed for effective heat transfer. Cold fingers 150 and heat transfer fins 140 may be made, for example, of copper, aluminum or their alloys.

Figure 22:
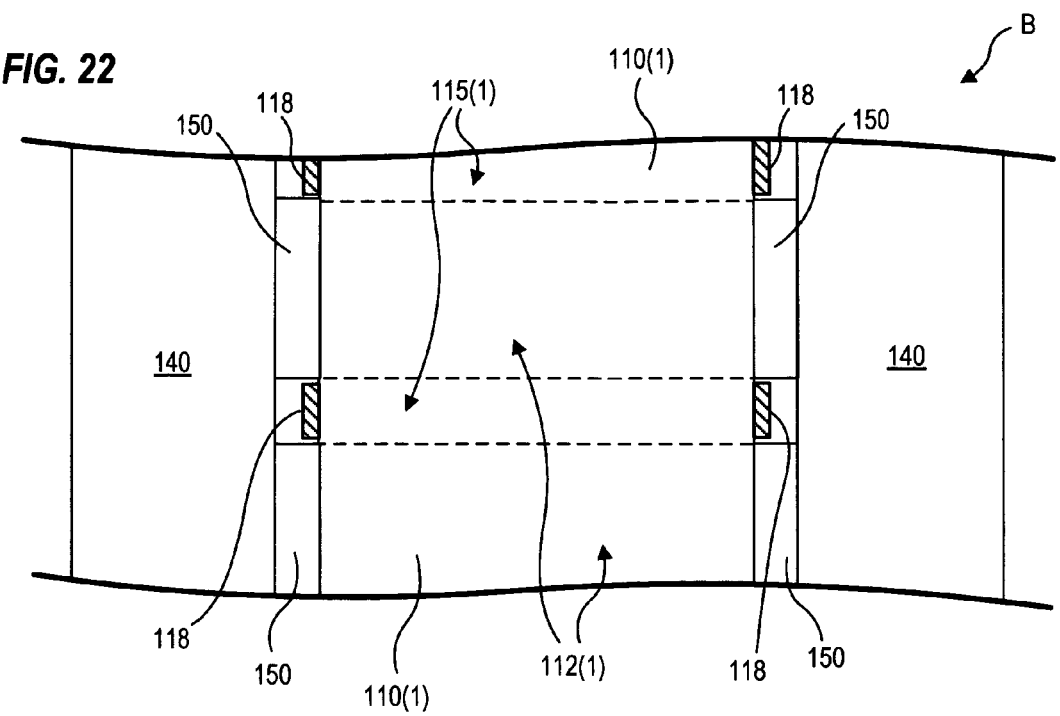
FIG. 22 shows a portion of the tubular icemaker of FIG. 20.

FIG. 22 shows portion B of tubular icemaker 100(1) in greater detail. Cold fingers 150 substantially encircle tube 110(1), and define corresponding ice growth locations 112(1) that are continuous about the inside of tube 110(1). Ice growth regions 112(1) are separated by ice separation regions 115(1); ice does not grow in regions 115(1). Ice separation regions 115(1) may be defined as areas that are not adjacent to cold fingers 150, or temperature control elements 118 may be provided to raise the temperature of tube 110(1) at regions 115(1). For example, temperature control elements 118 may be insulation that impedes heat flow from regions 118 to heat conduction fins 140. Alternatively, temperature control elements may be heaters that raise the temperature of ice separation regions 115(1).

Referring again to FIG. 20, ice 6(6) grows adjacent to cold fingers 150 as water 130 flows through tube 110(1). Surplus water 155 that does not freeze passes through a separation screen 160 into a holding tank 170, where it adds to supply water 190. Water 130 that freezes into ice 6(6) and thus does not return to supply water 190 is replenished by a water supply 220 controlled by a supply valve 230. A pump 200 in holding tank 170 pumps water 190 through a tube 205 to spray head 120 to begin the process as described above. An optional heater 210 may be utilized to keep water 190 from freezing.

Ice rings 6(6) are harvested by closing a switch 12(9) to supply electrical power from a power supply 14(1) to tube 110(1). FIG. 20 shows a busbar 125 coupling an upper end of tube 110(1) through switch 12(9) to one side of power supply 14(1), and a lower end of tube 110(1) connected to a ground 16; however, it is appreciated that the connections of power and ground may be reversed. In one embodiment, with tube 110(1) formed of stainless steel having a thickness of about 10 mils, switch 12(9) closes for about one second, supplying a pulse of electrical power of about one to six volts AC and of about 300 amperes current. The electrical power dissipated in tube 110(1) raises the temperature of tube 110(1) above the freezing point of water so that at least an interfacial layer of ice rings 6(6) melts, ice rings 6(6) detach (in this case, loosen) from tube 110(1), and gravity pulls ice rings 6(6) downward out of tube 110(1).

It is appreciated that an electrical resistance of tube 110(1) may be selected for compatibility with a voltage and current capacity of power supply 14(1) and switch 12(9). For example, a tube 110(1) that presents a low electrical resistance may dictate use of a high current, low voltage power supply 14(1) and switch 12(9), but an icemaking tube 110(1) having higher resistance may enable use of a power supply 14(1) and switch 12(9) configured for a higher voltage and a lower current. In one embodiment, electrical resistance of tube 110 is optimized so that a commercially available line voltage such as 110-120 VAC or 220-240 VAC may serve as power supply 14(1).

Tube 110(1) is thus an example of heater 10, FIG. 1. Separation screen 160 urges ice rings 6(6) into collection bin 180 as harvested ice rings 6(7).

Ice 6(6) grown as described herein may reject dissolved air and contaminants into surplus water 155 that drips from tube 110(1). Accordingly, ice rings 6(6) (and harvested ice rings 6(7)) may be of high quality and transparency. Dissolved air and contaminants may accumulate in water 190; icemaker 100(1) may therefore include a drain 240, controlled by a drain valve 250, to drain off at least a portion of water 190 periodically. Drained water is replaced from water supply 220. In an alternative embodiment (not shown), holding tank 170 and pump 200 are eliminated; water supply 220 supplies spray head 120 directly, and surplus water 155 simply drains away.

Figure 21:
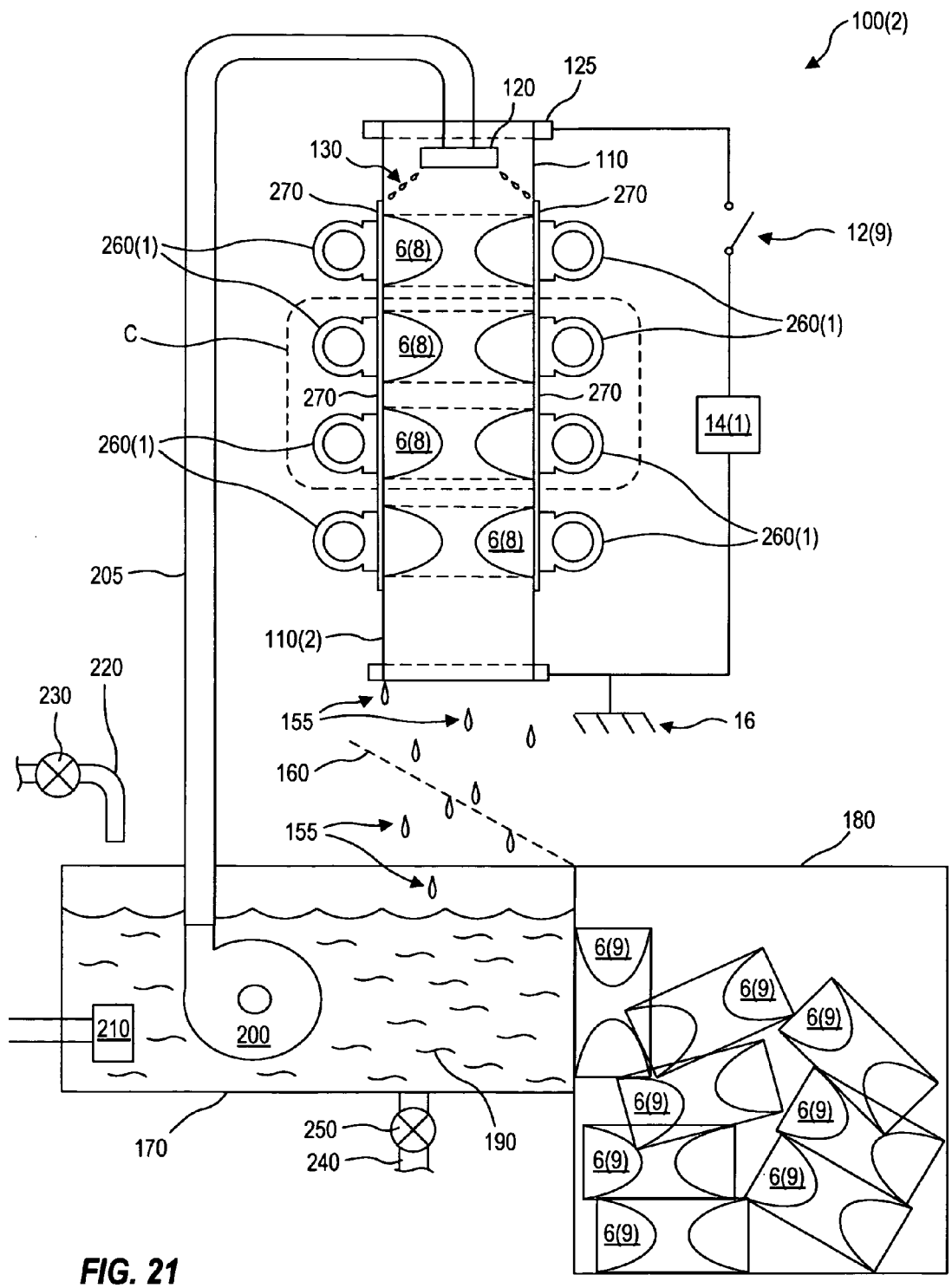
FIG. 21 shows one pulse electrothermal ice detachment apparatus configured as a tubular icemaker, in accord with an embodiment.

FIG. 21 shows a pulse electrothermal ice detachment apparatus configured as a tubular icemaker 100(2). FIG. 21 may not be drawn to scale. A portion of tubular icemaker 100(2) labeled C is shown in greater detail in FIG. 23. Icemaker 100(2) includes certain elements that are identical to, and therefore numbered identically as, corresponding elements of tubular icemaker 100(1). Tubular icemaker 100(2) uses coolant tubes 260(1) to cool ice growth regions (see FIG. 23). Coolant tubes 260(1) may be made, for example, of copper, aluminum or their alloys. A dielectric layer 270 electrically isolates a tube 110(2) from coolant tubes 260(1), but has minimal effect on transfer of heat from tube 110(2) to tubes 260(1). Dielectric layer 270 may be formed, for example, of polyimide, or of a polymer filled with thermally conductive fibers or powder, alumina fibers or powder, glass fiber, or boron nitride powder. Ice 6(8) grows adjacent to tubes 260(1) as water 130 flows through tube 110(2); ice rings 6(8) are harvested by closing a switch 12(9) to supply electrical power from a power supply 14(1) to tube 110(2); and separation screen 160 urges ice rings 6(8) into collection bin 180 as harvested ice rings 6(9), in a manner similar to how ice is grown and harvested in icemaking system 100(1).

Figure 23:
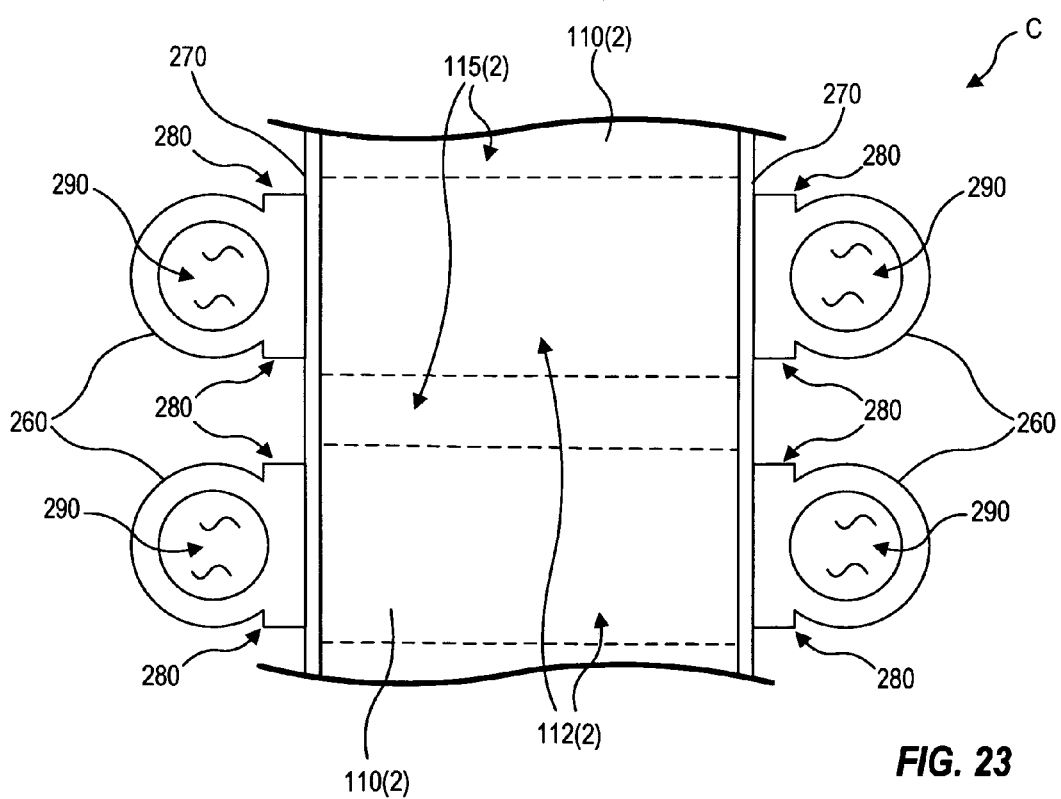
FIG. 23 shows a portion of the tubular icemaker of FIG. 21.

FIG. 23 shows portion C of tubular icemaker 100(2) in greater detail. Each of coolant tubes 260(1) flows coolant 290, and has a cold finger 280 that defines a corresponding ice growth location 112(2). Ice growth regions 112(2) are separated by ice separation regions 115(2); ice does not grow in regions 115(2). Ice separation regions 115(2) are defined in FIG. 23 as areas that are not adjacent to cold fingers 280; however, it is appreciated that temperature control elements 118 may be provided to raise the temperature of tube 110(2) at regions 115(2) in the same manner as shown in FIG. 22.

Figure 24:
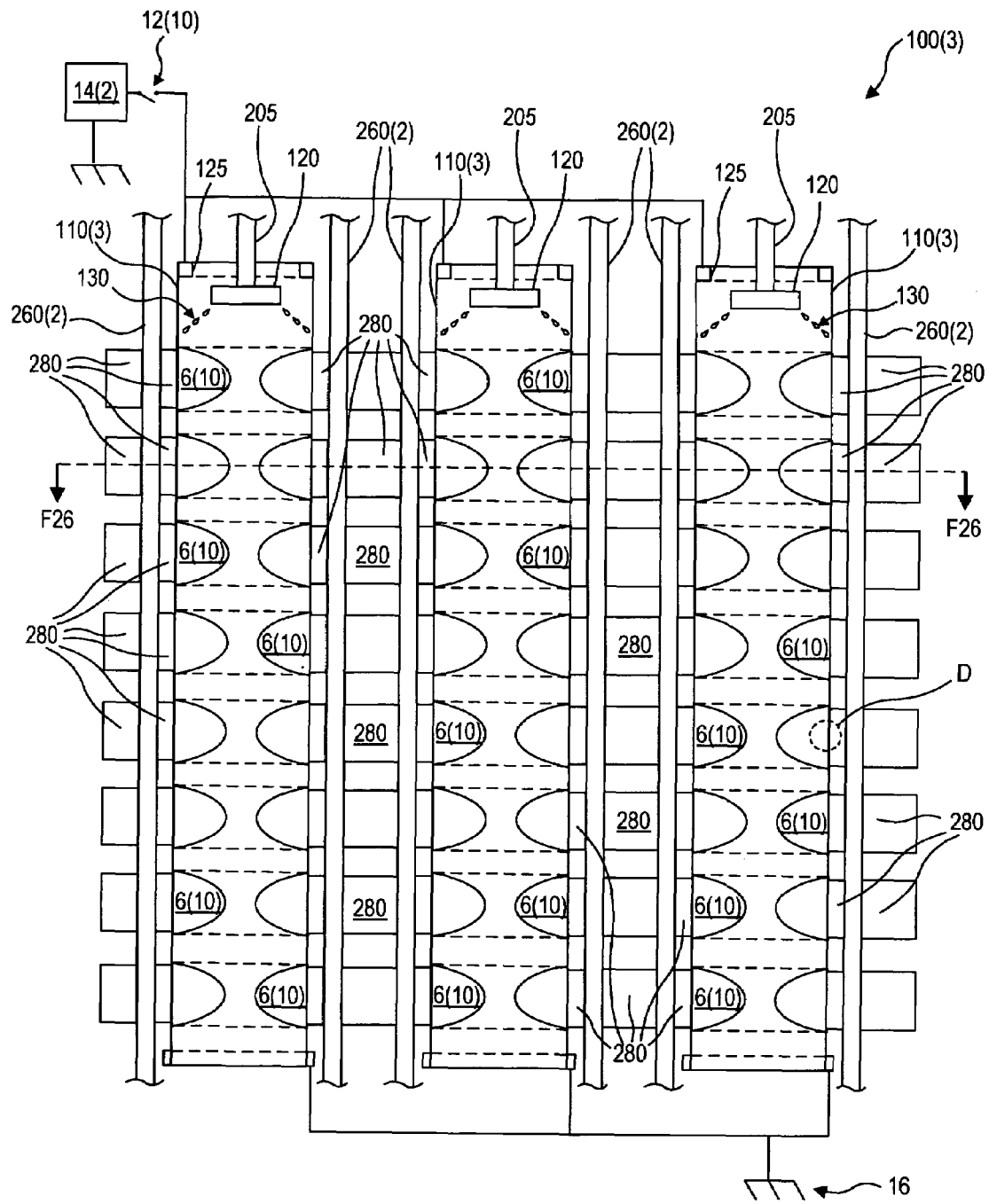
FIG. 24 is a cross-sectional side view of one pulse electrothermal ice detachment apparatus configured as a tubular icemaker, in accord with an embodiment.

FIG. 24 is a cross-sectional side view of a pulse electrothermal ice detachment apparatus configured as a tubular icemaker 100(3). FIG. 24 may not be drawn to scale. A portion D of icemaker 100(3) is shown in greater detail in FIG. 25. A cross-sectional top view of icemaker 100(3), taken through dashed line F26-F26 of FIG. 24, is shown in FIG. 26. Icemaker 100(3) includes certain elements that are identical to, and therefore numbered identically as, corresponding elements of tubular icemakers 100(1) and 100(2). Icemaker 100(3) makes ice rings 6(10) in each of several icemaking tubes 110(3) that mount with heat transfer plates 280 (only some of heat transfer plates 280 and ice 6(10) are labeled in FIG. 24, for clarity of illustration). Tubes 110(3) may be formed, for example, of stainless steel or a titanium alloy. Heat transfer plates 280 may be made, for example, of copper, aluminum or their alloys. Coolant tubes 260(2) circulate coolant that removes heat from heat transfer plates 280 and from tubes 110(3). Tubes 205 supply spray heads 120 that spray water 130 onto an interior surface of each tube 110(3). When ice rings 6(10) are ready for harvesting, switch 12(10) couples a pulse of electrical power from power supply 14(2) into each of busbars 125 and, in turn, through each of tubes 110(3) to ground 16. Heat generated in each of tubes 110(3) by the electrical power melts at least an interfacial layer of each ice ring 6(10), detaching the ice rings so that they drop from tubes 110(3). It is appreciated that provisions for separating unfrozen water from harvested ice, capturing the unfrozen water in a holding tank, draining and replenishing the holding tank, pumping water up to spray heads 120, and determining when ice is ready for harvesting may be the same as the provisions illustrated in FIG. 20 and FIG. 21.

Figure 25:
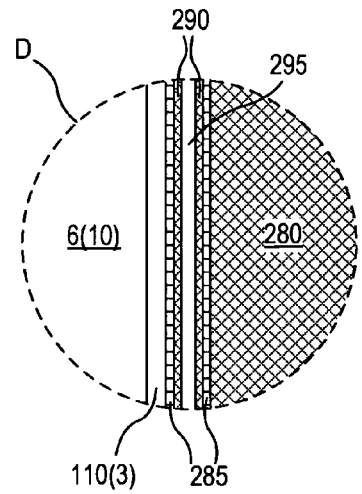
FIG. 25 shows one embodiment of a portion of the tubular icemaker of FIG. 24 in greater detail.
Figure 26:
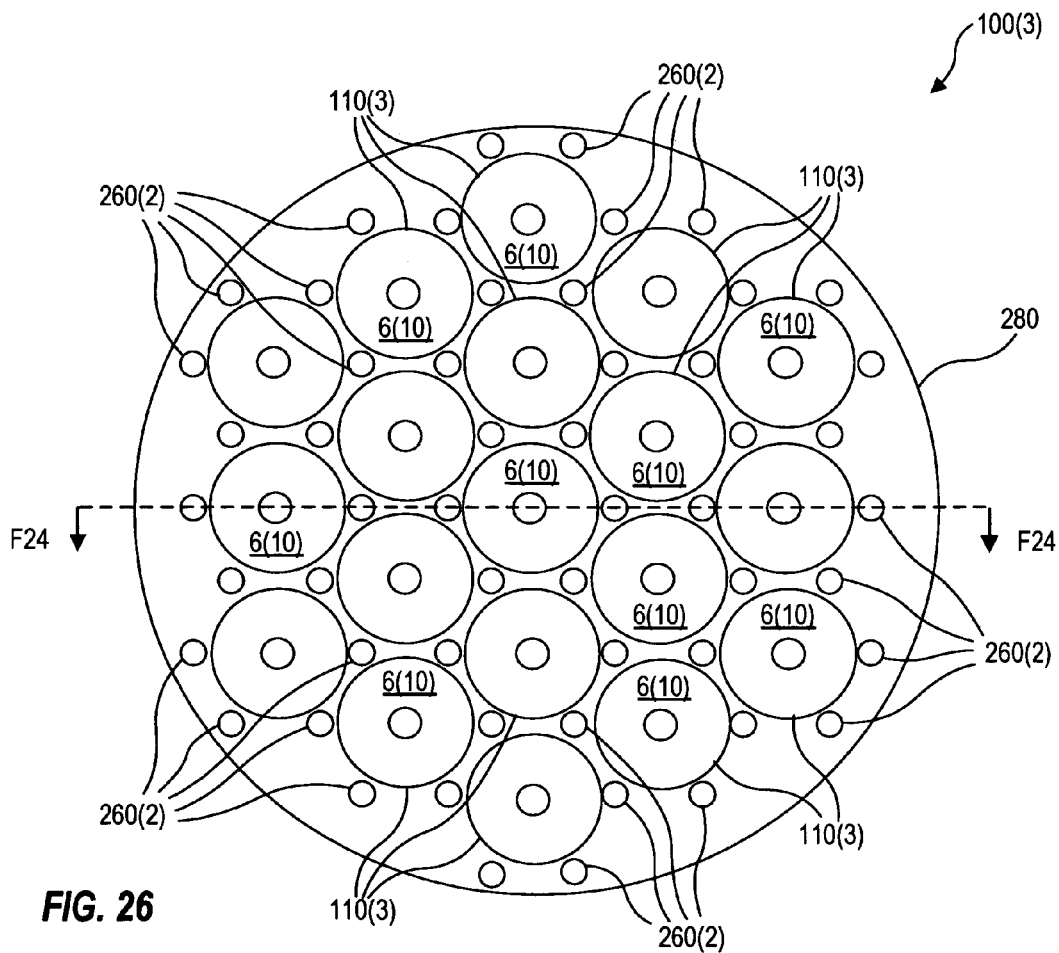
FIG. 26 is a cross-sectional top view of the tubular icemaker of FIG. 24.

FIG. 25 shows one embodiment of portion D of tubular icemaker 100(3) in greater detail. Ice 6(10) grows immediately adjacent to icemaking tube 110(3). A dielectric layer 295 is disposed between tube 110(3) and heat transfer plate 280 to electrically isolate tube 110(3) from plate 280. Dielectric layer 295 may be, for example, a polyimide film clad between layers of copper 290 that is available from DuPont. Alternatively, dielectric layer 295 may include a polymer filled with thermally conductive fibers or powder, alumina fibers or powder, glass fiber, or boron nitride powder. Copper layers 290 may attach to tube 110(3) and heat transfer plate 280 with layers of solder 285. For example, tube 110(3) may be prepared by wrapping it first with solder foil, then wrapping it in polyimide film 295 that is clad between copper layers 290, then wrapping again with solder foil. Multiple tubes 110(3) prepared in this manner may be inserted into holes in heat transfer plates 280, then the entire assembly may be placed in a furnace to reflow solder 285 to tubes 110(3), copper layers 290 and heat transfer plates 280.

In another embodiment, heat transfer plates 280 may be separated into sections that are assembled to tubes 110(3) with a dielectric, thermally conductive adhesive instead of by soldering to a dielectric film.

FIG. 26 is a cross-sectional top view of tubular icemaker 100(3) along line F26-F26 shown in FIG. 24. FIG. 26 may not be drawn to scale. Each of icemaking tubes 110(3) and coolant tubes 260(2) passes through one or more heat transfer plates 280. Although FIG. 26 shows a hexagonal array of nineteen icemaking tubes 110(3) and fifty-four coolant tubes 260(2), other numbers and arrangements of icemaking tubes 110(3), coolant tubes 260(2) and heat transfer plates 280 may be utilized in order to achieve an intended icemaking capacity or to fit an intended location. Icemaker 100(3) thus forms an array of icemaking tubes 110(3) wherein ice 6(10) grows at each intersection of an icemaking tube 110(3) and a heat transfer plate 280, as shown in FIG. 24 (which represents a cross-sectional view of icemaker 100(3) along line F24-F24 shown in FIG. 26).

Alternative embodiments of tubular icemakers 100 (e.g., any of tubular icemakers 100(1), 100(2) and 100(3)) disclosed herein will be apparent upon fully reading and appreciating the present disclosure, and are within the scope of the present disclosure. For example, tube 110 (e.g., any of tubes 110(1), 110(2) or 110(3)) may be circular in cross-section, or it may be of other cross-sectional shapes, and may produce corresponding ice shapes such as ice squares, rectangles, ellipses, triangles or stars. Spray head 120 may be replaced by one or more nozzles for spraying water 130, or by one or more elements for pouring or otherwise introducing water 130 onto the inside surface of tube 110. Busbar 125 may be located outside the circumference of tube 110, as shown in FIG. 20 and FIG. 21, or may be located inside the circumference of tube 110, as shown in FIG. 24. Cold fingers 150 may be sufficient to transfer heat away from ice growth regions 112(1), so that heat conduction fins 140 are not needed. Apparatus may be provided that detects ice formation and determines when to harvest ice 6(6), 6(8) or 6(10); for example by capacitively sensing the ice, by optically sensing the ice, by determining the weight of the ice, by determining an elapsed icemaking time or by determining that water flow is impeded by ice. Apparatus may be provided that detects the level of harvested ice in a collection bin (e.g., bin 180), and stops ice making when sufficient ice is in the collection bin. Separation screen 160 may be replaced by a moveable element that captures ice rings when they are harvested, but moves out from under tube(s) 110 at other times. Separation screen 160 may be heated to avoid undesirable accumulation of ice that would block water collection. Pump 200, heater 210, supply valve 230, drain valve 250, temperature control elements 118 and/or switch 12(9) may be operated by a controller (e.g., a microprocessor; for example, a microprocessor that operates a freezer in which icemaker 100 is located). Temperature sensors may be utilized to provide data to so that the microprocessor can optimize operation of the elements of icemaker 100 and/or a freezer or other equipment space in which icemaker 100 is located. Tubes 110(3) of icemaker 100(3) may be electrically connected individually or in groups, so that ice 6(10) is harvested from one tube 110(3) or one group of tubes 110(3) at a time. Harvesting ice 6(10) from fewer than all of tubes 110(3) at the same time may reduce the current handling capacity, and thus the size, weight and/or cost of components associated with generating and switching the current required for ice harvesting.

Still other embodiments of a pulse electrothermal ice detachment apparatus configured as a tubular icemaker utilize a heater that is in thermal contact with one or more icemaking tubes 110. Such embodiments may advantageously utilize any of a wide variety of materials for icemaking tube 110. For example, in one embodiment a tubular icemaker includes an icemaking tube 110 formed of stainless steel or other metals, glass, plastic, polymer, Teflon®, ceramic or carbon fiber materials, or composites or combinations thereof. The icemaking tube 110 may be heated by a flexible heater element wrapped about the tube, for detaching ice formed therein. Suitable heater elements may include metal-to-dielectric laminates such as, for example, an Inconel clad Kapton laminate. Utilizing a heater element wrapped about an icemaking tube 110 may allow design options such as optimizing the tube's material characteristics (e.g., corrosion resistance, antimicrobial properties) independently of heater characteristics (e.g., higher electrical resistance so that high current, high cost power supplies need not be utilized). When a conductive tube 110 is utilized, care may be exercised in design to ensure that the tube's conductivity is either accounted for in the design of the power supply 14 and switches 12, or that the tube is electrically isolated from the heater element. Thermal resistance between a heater and an icemaking tube 110, and thermal resistance among a coolant tube 260 or heat conduction fins 140, a heater, and an icemaking tube 110 are advantageously low so that icemaking efficiency is high, and power required for ice harvesting is low.

Figure 27:
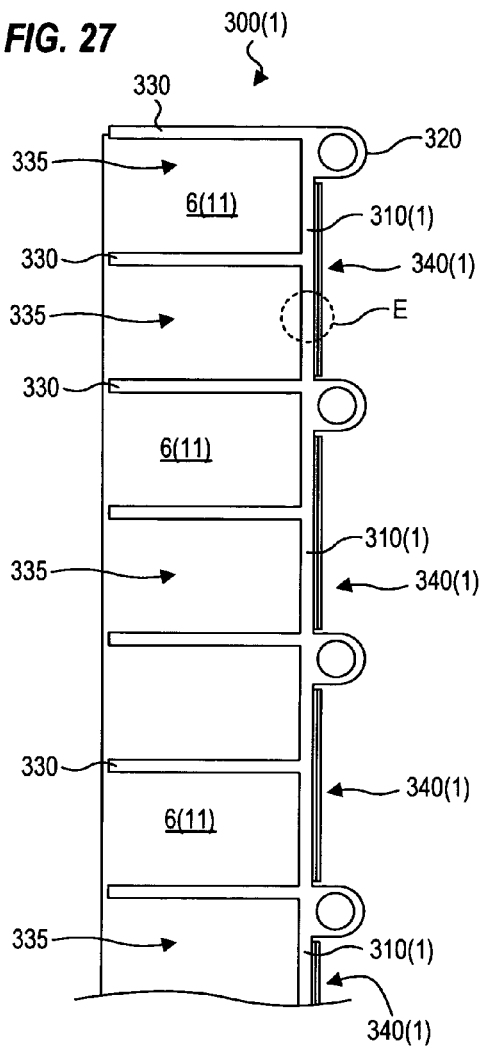
FIG. 27 is a cross-sectional illustration of one pulse electrothermal ice detachment apparatus configured as an icemaker, in accord with an embodiment.

FIG. 27 is a cross-sectional illustration of a pulse electrothermal ice detachment apparatus configured as an icemaker 300(1). FIG. 27 may not be drawn to scale. A portion E of icemaker 300(1) is shown in greater detail in FIG. 28. Icemaker 300(1) includes an evaporator plate 310(1) and fins 330 cooled by coolant (not shown) that flows through coolant tubes 320. Fins 330 divide icemaking pockets 335, as shown. Water is introduced adjacent to plate 310(1) and/or fins 330, and freezes into ice 6(11) (only some of tubes 320, fins 330, icemaking pockets 335 and ice 6(11) are labeled in FIG. 27, for clarity of illustration). Evaporator plate 310(1), coolant tubes 320 and/or fins 330 may be made, for example, of copper, aluminum or their alloys. Icemaker 300(1) also includes one or more heaters 340(1) for harvesting ice 6(11) using pulse electrothermal ice detachment as further described below. Heaters 340(1) are thus examples of heater 10, FIG. 1.

Figure 28:
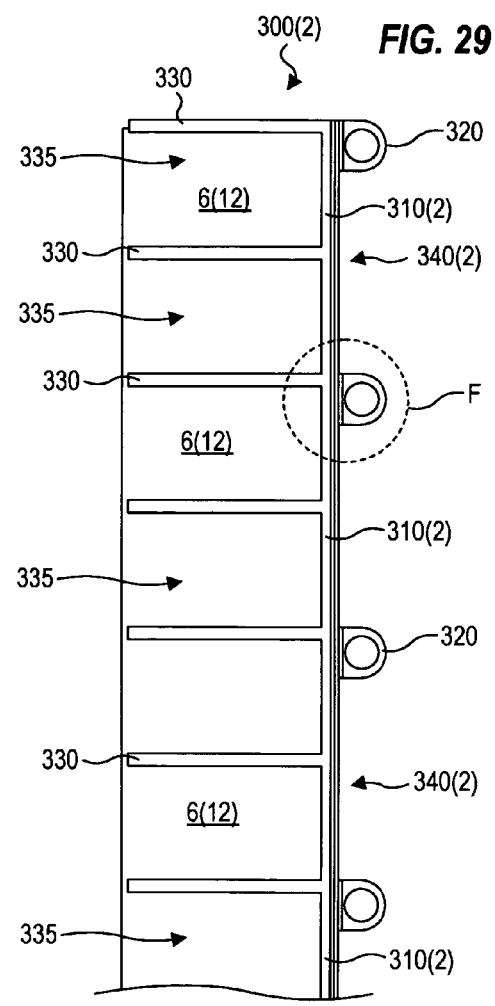
FIG. 28 shows a portion of the icemaker of FIG. 27 in greater detail.

FIG. 28 shows portion E of icemaker 300(1) in greater detail. The relative thicknesses of layers may not be drawn to scale in FIG. 28. Heater 340(1) includes a resistive heating layer 344(1) and a dielectric layer 342(1). Heating layer 344(1) may be formed, for example, of a layer of moderately resistive metal such as stainless steel or titanium alloy, or a thinner layer of a good electrical conductor such as copper. Dielectric layer 342(1) is advantageously formed of a material that is an electrical insulator, but has high thermal conductivity, and thus serves to electrically insulate heating layer 344(1) from plate 310(1) while facilitating heat transfer thereto. In one embodiment, heater 340(1) is a printed circuit board, with dielectric layer 342(1) being a dielectric layer such as epoxy glass, polyimide, polyimide glass, or Teflon®, with heating layer 344(1) being an electrical conductor such as copper.

In operation, icemaker 300(1) grows ice until harvesting is desired, then couples electrical power to heating layer 344(1). Heat generated by layer 344(1) quickly heats plate 310(1) and fins 330, detaching ice 6(11). Once ice 6(11) is harvested, the electrical power disconnects from heating layer 344(1) so that icemaking can begin again.

Figure 29:
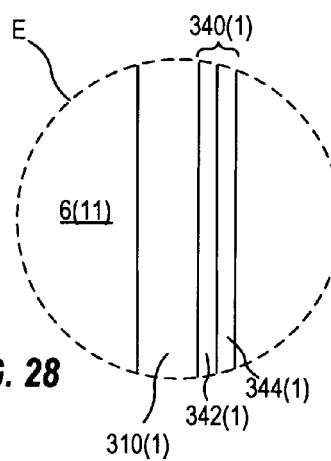
FIG. 29 is a cross-sectional illustration of one pulse electrothermal ice detachment apparatus configured as an icemaker, in accord with an embodiment.

FIG. 29 is a cross-sectional illustration of a pulse electrothermal ice detachment apparatus configured as an icemaker 300(2). FIG. 29 may not be drawn to scale. A portion F of icemaker 300(2) is shown in greater detail in FIG. 30. Icemaker 300(2) includes certain elements that are identical to, and therefore numbered identically as, corresponding elements of icemaker 300(1) (only some of tubes 320, fins 330, icemaking pockets 335 and ice 6(12) are labeled in FIG. 29, for clarity of illustration). Icemaker 300(2) has a single heater 340(2) that substantially covers a surface 315 (see FIG. 30) of evaporator plate 310(2); heater 340(2) is disposed between plate 310(2) and coolant tubes 320. The placement of heater 340(2) improves ice harvesting efficacy by providing heat at every point of surface 315. Evaporator plate 310(2), coolant tubes 320 and/or fins 330 may be made, for example, of copper, aluminum or their alloys.

Figure 30:
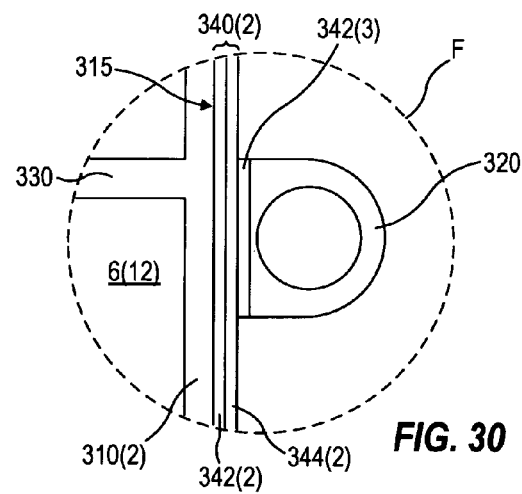
FIG. 30 shows a portion of the icemaker of FIG. 29 in greater detail.

FIG. 30 shows portion F of icemaker 300(2) in greater detail. FIG. 30 may not be drawn to scale. Heater 340(2) includes a resistive heating layer 344(2) and a dielectric layer 342(2). Dielectric layer 342(2) is advantageously formed of a material that is an electrical insulator but has high thermal conductivity, and thus electrically insulates heating layer 344(2) from plate 310(2) while facilitating heat transfer thereto. For example, dielectric layer 342(2) may include polyimide, a polymer filled with thermally conductive fibers or powder, alumina fibers or powder, glass fiber, or boron nitride powder. FIG. 30 also shows an optional dielectric layer 342(3) disposed between heating layer 344(2) and tube 320. Dielectric layer 342(3) may be used to electrically insulate heating layer 344(2) from tube 320 in order to control electrical resistance of layer 344(2). Alternatively, dielectric layer 342(3) may be eliminated so that tube 320 couples electrically with layer 344(2).

In operation, icemaker 300(2) grows ice 6(12) until harvesting is desired, then couples electrical power to heating layer 344(2). Heat generated by layer 344(2) quickly heats plate 310(2) and fins 330, detaching ice 6(12). Once ice 6(12) is harvested, the electrical power disconnects from heating layer 344(2) so that icemaking can begin again.

Figure 31:
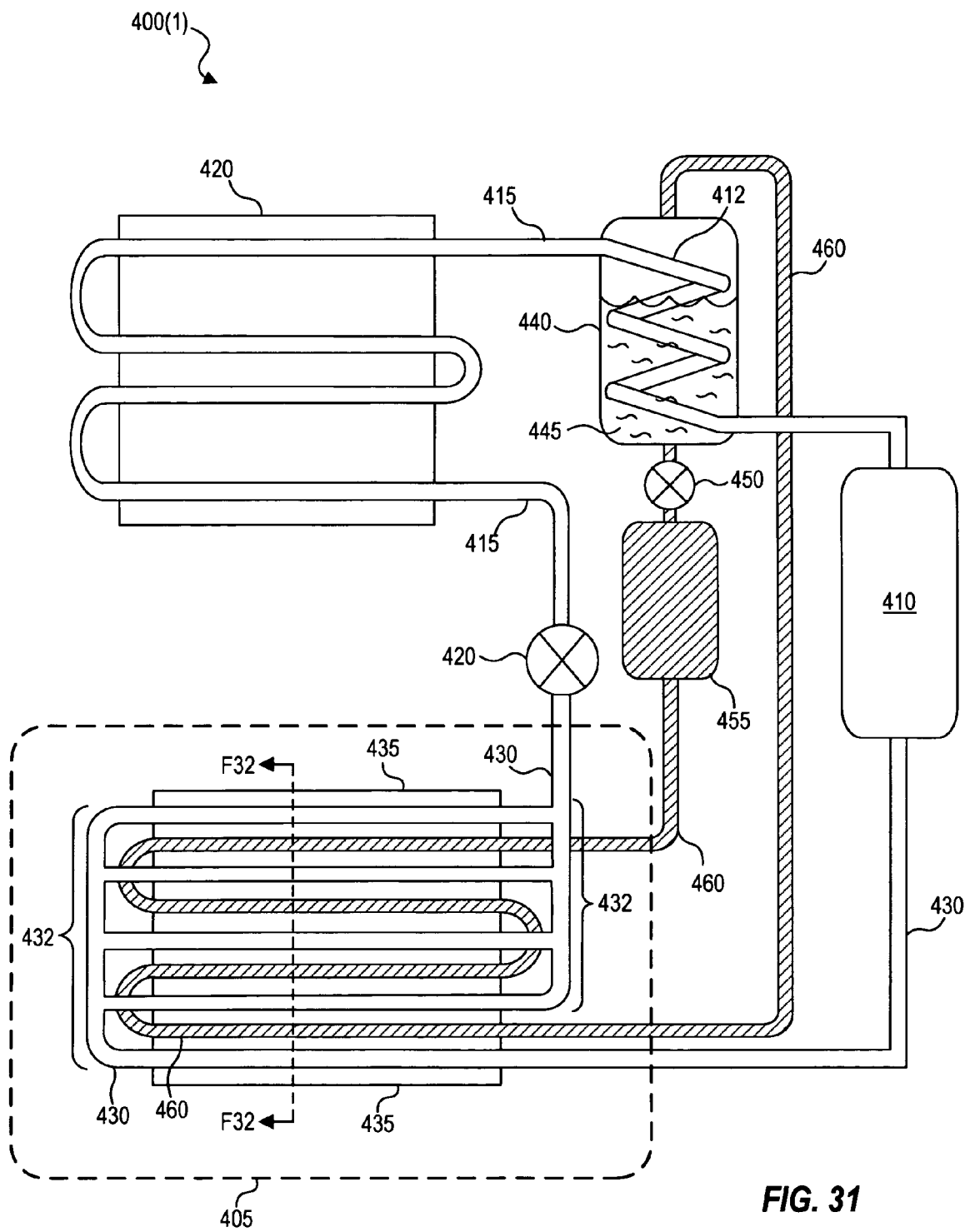
FIG. 31 schematically shows elements of a freezer unit that includes a heat-storage apparatus for detaching ice, in accord with an embodiment.

FIG. 31 schematically shows elements of a freezer unit 400(1) that includes a heat-storage apparatus for detaching ice. FIG. 31 may not be drawn to scale. Freezer unit 400(1) has a compressor 410 for compressing a coolant. The coolant is at a high temperature upon leaving compressor 410, and passes through a tube 412 in a tank 440 where it transfers heat to a heating liquid 445 (elements of freezer unit 400(1) that transfer only heating liquid 445 are shown as cross-hatched in FIG. 31). Heating liquid 445 is preferably a liquid with a freezing point below −20C and a boiling point above 60C, such as alcohol, a water/glycol mixture or brine. The coolant leaves tank 440 in tube 415 and transfers more heat in a condenser 420. Tube 415 continues to expansion valve 420, where the coolant expands rapidly, cooling to a subfreezing temperature. After expansion valve 420, coolant passes into tubes 430 and into a freezer compartment, shown in FIG. 31 by dashed line 405. Coolant tubes 430 are in thermal contact with, and transfer heat away from, an evaporator plate 435 that is part of an icemaker. A dashed line F32-F32 denotes a plane in evaporator plate 435 shown in cross-section in FIG. 32. After passing through coolant tubes 430, the coolant flows back to compressor 410 to repeat the cycle of compressing the coolant, cooling the coolant, and cooling the evaporator plate.

While freezer unit 400(1) makes ice, heating liquid 445 gathers and retains waste heat from coolant in tank 440. An outlet valve 450 and a pump 455 control transfer of heating liquid 445 from tank 440 into a heating tube 460(1). Like tubes 430, heating tube 460(1) is in thermal contact with evaporator plate 435. When ice harvesting is desired, freezer unit 400(1) opens outlet valve 450 and activates pump 455, pumping heating liquid 445 through heating tube 460(1) and thereby generating a thermal pulse that detaches the ice from evaporator plate 435 for harvesting.

Figure 32:
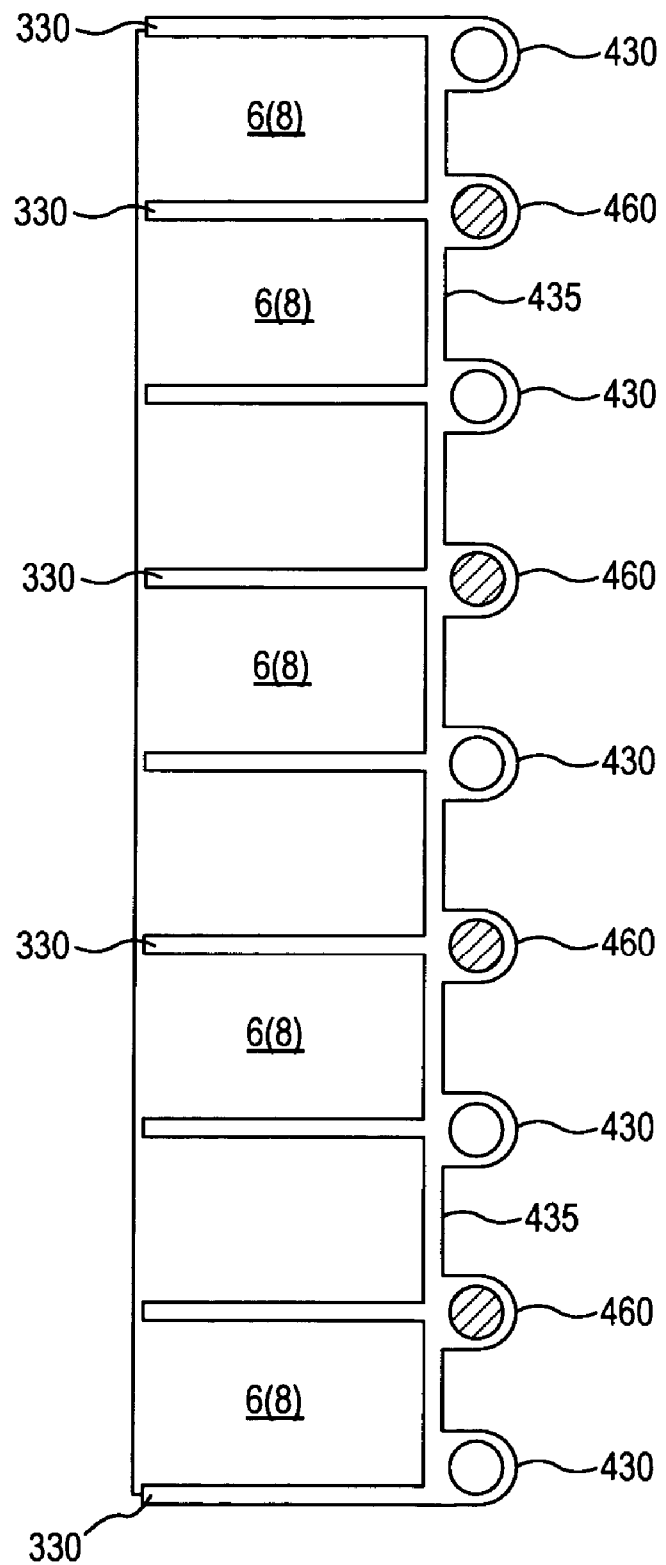
FIG. 32 is a cross-sectional view of an evaporator plate shown in FIG. 31.

FIG. 32 is a cross-sectional view along dashed line F32-F32 in FIG. 31. Evaporator plate 435 couples with coolant tubes 430 and heating tube 460(1) in an alternating sequence, as shown. The passage within heating tube 460(1) through which cooling liquid 445 passes is cross-hatched in FIG. 32 for consistency with FIG. 31. On an opposite side of evaporator plate 435 are fins 330 that transfer heat away from ice 6(13) during icemaking.

FIG. 31 shows coolant tubes 430 arranged as manifolds 432 within freezer compartment 405 so that coolant tubes 430 and heating tubes 460(1) can alternate across evaporator plate 435. In an alternative embodiment, coolant tubes and heating liquid tubes traverse evaporator plate 435 as a serpentine pair, but such an embodiment may have inside curves where either coolant tubes, heating liquid tubes or both form a "back to back" arrangement. Such arrangements may form "hot" or "cold" areas where icemaking or ice harvesting, respectively, require more time and/or energy. It is appreciated that heating tubes 460(1) could also form manifolds, or single tubes 430 and 460(1) could cross over at each end of the evaporator plate, to avoid forming "back to back" arrangements.

Performance of freezer unit 400(1) depicted in FIGS. 31 and 32 was simulated. An evaporator plate dimension of 457 mm×432 mm was assumed. Heating tube 460(1) was assumed to be a copper tube with an internal diameter of 16 mm and a length of 7.7 meters. Heating liquid 445 was assumed to be a mixture of equal parts water and glycol. Heating liquid 445 in tank 440 was assumed to reach a temperature of 60 C. The simulation showed that ice could be harvested in 2 seconds by pumping 0.9 liter of the water/glycol mixture by expending 10 watts of power in pump 455, with the water/glycol mixture reaching a pressure of 0.223 bar. This compares quite favorably to energy required for ice harvesting in a commercial icemaker, which may expend 1-2 kW of power for 60 to 300 seconds. The reduction of energy consumed in ice harvesting results in a higher icemaking rate over time, and lower energy costs.

Figure 33:
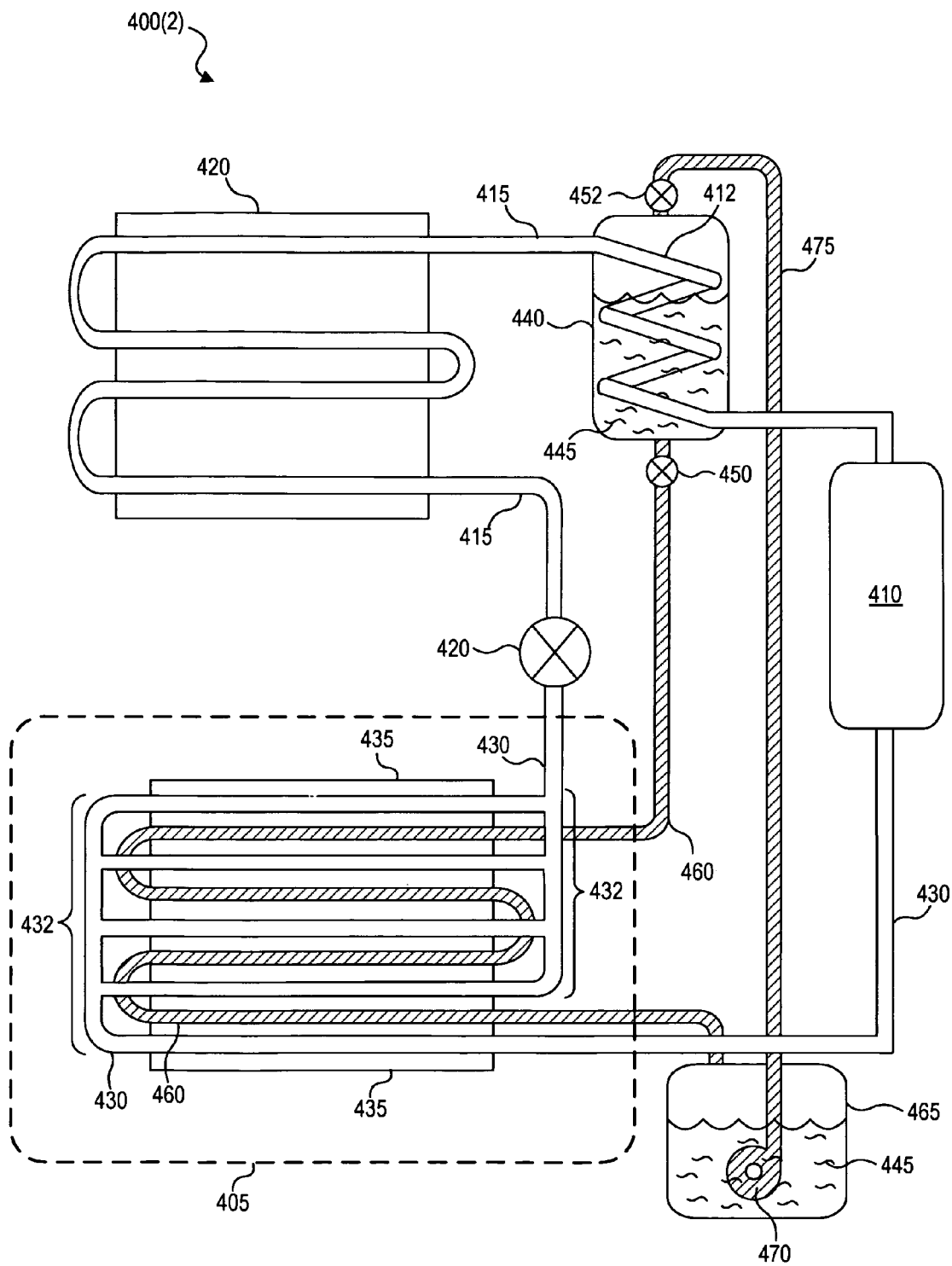
FIG. 33 schematically shows elements of a freezer unit that includes a heat-storage apparatus for detaching ice, in accord with an embodiment.

FIG. 33 schematically shows elements of a freezer unit 400(2) that includes a heat-storage apparatus for detaching ice. FIG. 33 may not be drawn to scale. Icemaker 400(2) includes certain elements that are identical to, and therefore numbered identically as, corresponding elements of icemaker 400(1). In icemaker 400(2), tank 440 may be located at a higher level than evaporator plate 435, so that when outlet valve 450 opens, gravity causes heating liquid 445 to flow into heating tube 460(1) to release ice from evaporator plate 435. Heating tube 460(1) may advantageously be large in diameter, to facilitate rapid flow of heating liquid 445 through heating tube 460(1); the rapid flow results in rapid warming of plate 435, effecting a rapid release of ice from plate 435. Icemaker 400(2) includes a heating liquid reservoir 465 located at a lower level than evaporator plate 435, so that heating liquid 445 drains into reservoir 465 after passing through heating tube 460(1). A pump 470 pumps heating liquid 445, through a tube 475 and an optional inlet valve 452 back to tank 440 for re-use. Pump 470 need not be of high capacity, since the transport of heating liquid 445 to tank 440 need not be complete until another ice harvesting occurs.

Alternative embodiments of freezer unit 400 (e.g., either of freezer unit 400(1) or 400(2) disclosed herein will be apparent upon fully reading and appreciating the present disclosure, and are within the scope of the present disclosure. For example, freezer unit 400 may turn off compressor 410 for the duration of ice harvesting in certain embodiments. However, since heat is generally applied for ice harvesting only for a few seconds, certain embodiments leave compressor 410 running during harvesting, to reduce wear incurred by compressor 410 during start/stop cycles, and to hasten thermal recovery of evaporator plate 435 so that icemaking may resume promptly after harvesting. Valves or pumps may be provided to drain heating liquid 445 from heating tube 460(1) except during ice harvesting, in order to save the energy that would otherwise be expended in cooling heating liquid 445 in heating tube 460(1) during icemaking, and cooling the same quantity of fluid 445 that returns to tank 440 during ice harvesting. In one embodiment, utilizing the components illustrated in FIG. 31, tank 440 is disposed lower than evaporator plate 435 so that gravity drains heating liquid 445 back into tank 440 except when pump 455 operates. In another embodiment, utilizing the components illustrated in FIG. 33, tank 440 and valves 450 and 452 are adapted to contain heating liquid 445 and its vapor when pressurized. When coolant in tube 412 heats heating liquid 445 and its vapor in tank 440, pressure builds so that when outlet valve 450 opens, vapor pressure forces heating liquid 445 rapidly through tube 460 for ice detachment and harvesting. After sufficient heating liquid 445 is forced into tube 460, outlet valve 450 closes, inlet valve 452 opens, and pump 470 can then begin returning heating liquid from reservoir 465 to tank 440.

Figure 34:
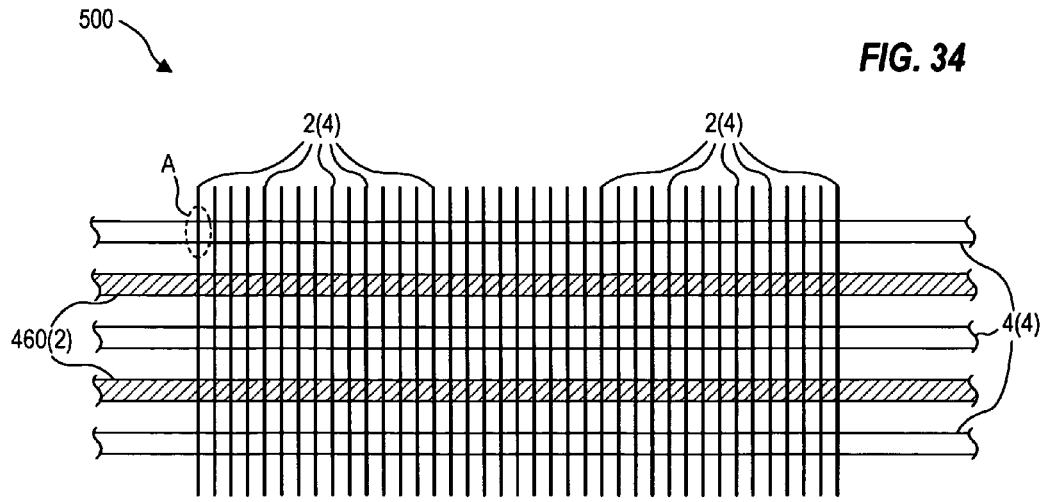
FIG. 34 shows a heat-storage ice detachment apparatus.

FIG. 34 shows a heat-storage ice detachment apparatus 500. Apparatus 500 includes coolant tubes 4(4) through which a coolant 8 (see FIG. 2A, FIG. 2B) flows, cooling fins 2(4), and heating tubes 460(2) through which a heating liquid 445 (see FIG. 31, FIG. 33) flows for ice detachment, as described below. Only a few fins 2(4) are labeled in FIG. 34, for clarity of illustration. Coolant tubes 4(4), cooling fins 2(4) and/or heating tubes 460(2) may be made, for example, of copper, aluminum or their alloys, or of other materials having low thermal resistivity. The location marked A is representative of portion A that is illustrated in FIG. 2A and FIG. 2B.

Like pulse electrothermal ice detachment apparatus 20(1) (see FIG. 3), apparatus 500 transfers heat to the coolant during normal operation, and ice 6 may accordingly form on tubes 4(4), fins 2(4) and/or heating tubes 460(2) (see FIG. 2A, FIG. 2B). When ice detachment is desired, heating liquid 445 (see FIG. 31, FIG. 33) flows through heating tube 460(2), heating apparatus 500 and detaching ice. It is appreciated that the illustration of three tubes 4(4) and two heating tubes 460(2) in FIG. 34 is exemplary only, and that any number of tubes 4(4) and 460(2) may be included in an ice detachment apparatus. Those skilled in the art will note similarities between heat-storage ice detachment apparatus 500, FIG. 34, and evaporator plate 435 with tubes 430 and 460 of freezer units 400(1) and 400(2), FIG. 31 and FIG. 33.

Figure 35:
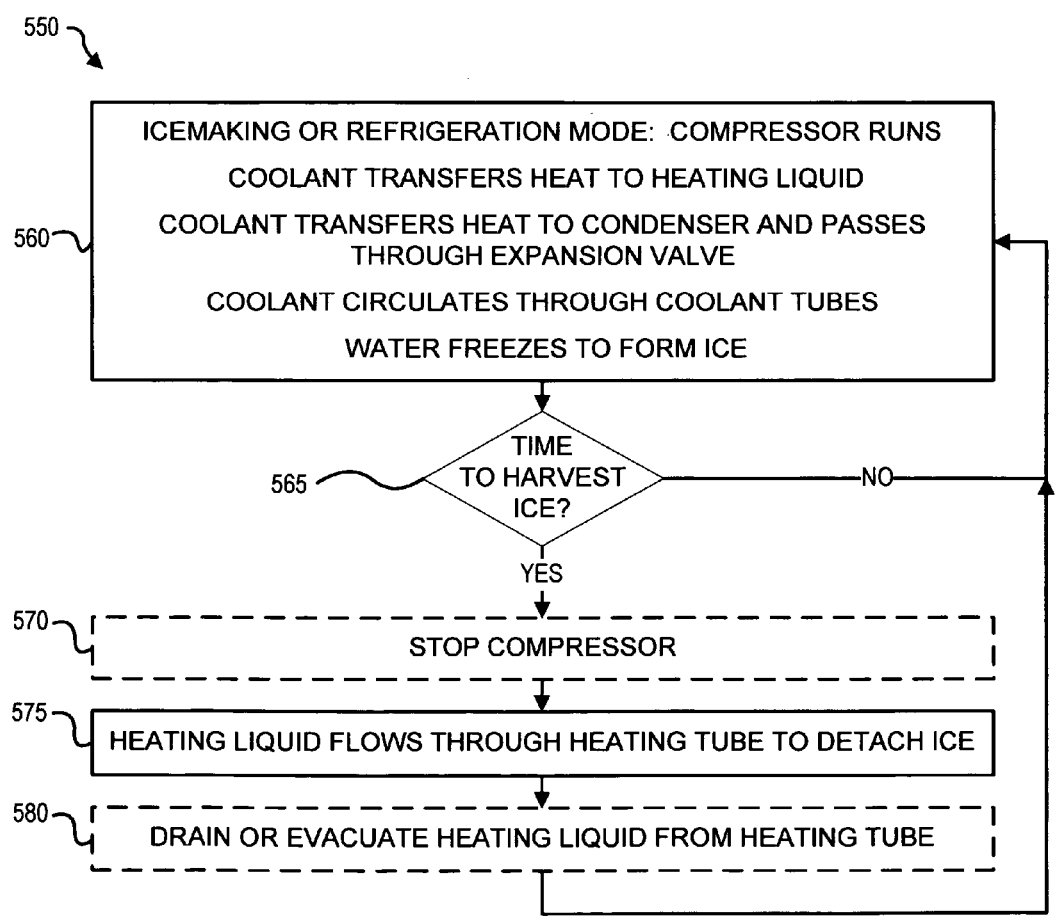
FIG. 35 is a flowchart of a process for operating a freezer unit that utilizes heat-storage ice harvesting.

FIG. 35 is a flowchart of a process 550 for operating a freezer unit that utilizes heat-storage ice harvesting. Process 550 may be implemented, for example, by either of freezer units 400(1) or 400(2). In step 560, the freezer unit operates in an icemaking mode. A compressor compresses a coolant, the coolant transfers heat to a heating liquid, transfers heat to a condenser, passes through an expansion valve, and circulates through coolant tubes of an icemaker, causing water to freeze, forming ice. An example of step 560 is compressor 410 compressing a coolant that (1) passes through tube 412, transferring heat to heating liquid 445 within tank 440, (2) transfers heat to condenser 420, (3) passes through expansion valve 420, and (4) circulates within tubes 430, causing water to freeze, forming ice. In step 565, the freezer unit determines when it is time to harvest ice. When it is time to harvest ice, process 550 follows step 570, otherwise icemaking continues in step 560. In step 570, the compressor stops running during the ice harvesting process. An example of step 570 is compressor 410 stopping. Step 570 is optional and may not occur in certain refrigeration units; for example, step 570 may not occur in units which would incur excessive wear and tear on the compressor due to repeated starting and stopping. Step 575 flows heating liquid through a heating tube to detach ice (e.g., to loosen, melt and/or vaporize the ice). Examples of step 575 are operating outlet valve 450 or operating pump 455 to flow heating liquid 445 through tube 460. The heating liquid melts at least an interfacial layer of ice to detach it. Step 580 drains or evacuates the heating liquid from the heating tube. Examples of step 580 are (1) stopping pump 455 so that heating liquid 445 flows back to tank 440 by force of gravity (see FIG. 31), and (2) closing outlet valve 450 so that heating liquid 445 drains to tank 465 by force of gravity (see FIG. 33). Once ice detachment is complete, process 550 resumes the normal icemaking mode in step 560.

The changes described above, and others, may be made in the pulse electrothermal and heat-storage ice detachment apparati described herein without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. Icemaker apparatus having pulse electrothermal ice detachment apparatus comprising:
    an icemaking tube comprising one or more ice growth regions;
    one or more cooling fins thermally connected via one or more cold rings to the icemaking tube at the one or more ice growth regions for transferring heat away from each ice growth region;
    apparatus for introducing water into the icemaking tube so that at least a portion of the water freezes into ice at the ice growth regions; and
    a power supply for periodically supplying a pulse of electrical power to the icemaking tube, to melt at least an interfacial layer of the ice to detach the ice from the tube, wherein duration of the pulse is limited such that a heat diffusion distance associated with the pulse is less than at least one of a thickness of the tube and a thickness of the ice;
    wherein the pulse of electrical power comprises at least five kilowatts of power per square meter of area of the icemaking tube.

2. Apparatus of claim 1, further comprising a thermal insulator formed by at least one of a polymer coating, an adhesive, a metal oxide and a composite-material film, the insulator separating at least some of the ice growth regions from one another.

3. Apparatus of claim 1, the power supply providing a voltage in a range of 1V to 24V.

4. Apparatus of claim 1, the power supply providing a voltage in a range of 1V to 6V.

5. Pulse electrothermal ice detachment apparatus of claim 1 wherein a wall of the icemaking tube forms the heater.

6. Apparatus of claim 1, the icemaking tube comprising one or more of a metal, glass, plastic, polymer, ceramic and carbon fiber.

7. Apparatus of claim 1, comprising a water supply controlled by a supply valve, and a drain controlled by a drain valve.

8. Apparatus of claim 7, comprising:
    a holding tank for holding water from the water supply; and
    a pump for pumping the water through the means for introducing.

9. Apparatus of claim 8, comprising a screen for separating surplus water, that drains from the icemaking tube, from the ice.

10. Apparatus of claim 8, comprising a heater to prevent water from freezing in the holding tank.

11. Apparatus of claim 1, comprising apparatus for determining when to harvest the ice by capacitively sensing the ice, by optically sensing the ice, by determining the weight of the ice, by determining an elapsed icemaking time or by determining that water flow is impeded by ice.

12. Pulse electrothermal ice detachment apparatus of claim 1, wherein
    the icemaking tube comprises a plurality of icemaking tubes;
    the one or more of a cold finger comprises one or more of cold fingers and coolant tubes for transferring heat away from ice growth regions of each icemaking tube;
    the means for introducing water into the icemaking tube comprises means for introducing water into each icemaking tube; and
    the power supply periodically supplies the pulse of electrical power to each tube.

13. Apparatus of claim 12, wherein the icemaking tubes form a plurality of groups, and the power supply periodically supplies a pulse of electrical power to one group at a time.

14. Apparatus of claim 13, comprising apparatus for determining when to harvest the ice in each group by capacitively sensing the ice of each group, by optically sensing the ice of each group, by determining the weight of the ice of each group, by determining an elapsed icemaking time of each group or by determining that water flow is impeded by ice of each group.

15. Icemaker apparatus having pulse electrothermal ice detachment apparatus comprising:
    an icemaking tube comprising one or more ice growth regions;
    at least one coolant tube in thermal contact with the icemaking tube at the one or more ice growth regions for transferring heat away from each ice growth region;
    a dielectric layer electrically, but not thermally, insulating the icemaking tube from the coolant tube(s);
    apparatus for introducing water into the ice making tube so that at least a portion of the water freezes into ice at the ice growth regions; and
    a power supply for periodically supplying a pulse of electrical power to a resistive electric heater in thermal contact with the tube, to melt at least an interfacial layer of the ice to detach the ice from the tube, wherein duration of the pulse is limited such that a heat diffusion distance associated with the pulse is less than at least one of a thickness of the tube and a thickness of the ice;
    wherein the pulse of electrical power comprises at least five kilowatts of power per square meter of area of the ice making tube.

16. Apparatus of claim 15, comprising one or more heat conduction fins to facilitate heat transfer from the one or more ice growth regions.

17. Apparatus of claim 1, further comprising a thermal insulator formed by at least one of a polymer coating, an adhesive, a metal oxide and a composite-material film, the insulator separating at least some of the ice growth regions from one another.

18. Pulse electrothermal ice detachment apparatus of claim 1, wherein
    the icemaking tube comprises a plurality of icemaking tubes;

the one or more of a cold finger and a coolant tube comprises one or more of cold fingers and coolant tubes for transferring heat away from ice growth regions of each icemaking tube;

the means for introducing water into the icemaking tube comprises means for introducing water into each icemaking tube; and the power supply periodically supplies the pulse of electrical power to each tube.

19. Apparatus of claim 15, wherein the icemaking tubes form a plurality of groups, and the power supply periodically supplies a pulse of electrical power to one group at a time.

20. Apparatus of claim 18, comprising apparatus for determining when to harvest the ice in each group by capacitively sensing the ice of each group, by optically sensing the ice of each group, by determining the weight of the ice of each group, by determining an elapsed icemaking time of each group or by determining that water flow is impeded by ice of each group.

21. Apparatus of claim 15, wherein the resistive electric heater is the icemaking tube.

* * * * *

UNITED STATES PATENT AND TRADEMARK OFFICE
CERTIFICATE OF CORRECTION

PATENT NO. : 7,638,735 B2
APPLICATION NO. : 11/338239
DATED : December 29, 2009
INVENTOR(S) : Victor Petrenko It is certified that error appears in the above-identified patent and that said Letters Patent is hereby corrected as shown below:

Column 9, line 33, "$1.22 \cdot 10^{-4} m^3$" should read --$1.221 \cdot 10^{-4} m^3$--

Signed and Sealed this

Ninth Day of February, 2010

David J. Kappos
*Director of the United States Patent and Trademark Office*